United States Patent
James et al.

(10) Patent No.: US 6,728,821 B1
(45) Date of Patent: *Apr. 27, 2004

(54) METHOD AND SYSTEM FOR ADJUSTING ISOCHRONOUS BANDWIDTHS ON A BUS

(75) Inventors: David Vernon James, Palo Alto, CA (US); Bruce Fairman, Woodside, CA (US); David Hunter, Santa Barbara, CA (US); Hisato Shima, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 435 days.

This patent is subject to a terminal disclaimer.

(21) Appl. No.: 09/723,958

(22) Filed: Nov. 27, 2000

Related U.S. Application Data

(60) Provisional application No. 60/167,958, filed on Nov. 29, 1999.

(51) Int. Cl.[7] ................ G06F 13/36; G06F 13/40
(52) U.S. Cl. ............. 710/306; 710/307; 710/312; 710/313; 710/310; 710/60; 710/61
(58) Field of Search ............... 710/306; 370/465, 370/260

(56) References Cited

U.S. PATENT DOCUMENTS

| | | |
|---|---|---|
| 4,538,259 A | 8/1985 | Moore |
| 4,935,894 A | 6/1990 | Termes et al. |
| 5,381,138 A | 1/1995 | Stair et al. |
| 5,394,556 A | 2/1995 | Oprescu |
| 5,402,416 A | 3/1995 | Cieslak et al. |
| 5,485,505 A | 1/1996 | Norman et al. |
| 5,511,165 A | 4/1996 | Brady et al. |
| 5,579,486 A | 11/1996 | Oprescu et al. |
| 5,603,084 A | 2/1997 | Henry et al. |
| 5,623,483 A | 4/1997 | Agrawal et al. |
| 5,630,173 A | 5/1997 | Oprescu |
| 5,684,796 A | 11/1997 | Abidi et al. |
| 5,684,959 A | 11/1997 | Bhat et al. |
| 5,689,499 A | 11/1997 | Hullett et al. |
| 5,717,853 A | 2/1998 | Deshpande et al. |
| 5,724,517 A | 3/1998 | Cook et al. |
| 5,734,824 A | 3/1998 | Choi |
| 5,751,967 A | 5/1998 | Raab et al. |
| 5,757,772 A | 5/1998 | Thornberg et al. |
| 5,764,930 A | 6/1998 | Staats |
| 5,774,683 A | 6/1998 | Gulick |
| 5,790,815 A | 8/1998 | Swanstrom et al. |
| 5,799,530 A | 9/1998 | Nagasawa |
| 5,812,774 A | 9/1998 | Kempf et al. |
| 5,825,752 A * | 10/1998 | Fujimori et al. ............ 370/260 |
| 5,828,899 A | 10/1998 | Richard et al. |
| 5,832,245 A | 11/1998 | Gulick |

(List continued on next page.)

OTHER PUBLICATIONS

1394 Trade Association, The Multimedia Connection, TA Document 1999026, A V/C General Command and Response Model 4.1, Draft 0.1:35, May 22, 1999, pp. 1–46.

1394 Trade Association, The Multimedia Connection, TA Document 1999025, A V/C Descriptor and Info Block mechanism, Draft 0.:212, Dec. 17, 1999, pp. 1–143.

"IEEE 1394: A Ubiquitous Bus", Gary Hoffman and Daniel Moore, Compcon '95 in San Francisco, CA Mar. 5–Mar. 9, 1995, http://www.skiptone.com/compcon.html (9 pages).

"Fire on the Wire: The IEEE 1934 High Performance Serial Bus", The IEEE Microcomputer Standards Committee, 1986. http://www.chumpchange.com/parkplace/video/dvpapers/firewire.html (4 pgs.).

*Primary Examiner*—Glenn A. Auve
*Assistant Examiner*—Christopher E Lee
(74) *Attorney, Agent, or Firm*—Blakely, Sokoloff, Taylor & Zafman LLP

(57) ABSTRACT

A method and system for adjusting the bandwidth allocated for isochronous data traffic on an interconnected data bus is disclosed. The present system uses an isochronous resource manager (IRM) to sense a bandwidth change request from a talker. The IRM instigates a bandwidth adjustment associated with the bandwidth change request to one or more bus bridge portals.

29 Claims, 23 Drawing Sheets

U.S. PATENT DOCUMENTS

| | | |
|---|---|---|
| 5,842,124 A | 11/1998 | Kenagy et al. |
| 5,848,266 A | 12/1998 | Scheurich |
| 5,854,910 A | 12/1998 | Gulick |
| 5,870,387 A | 2/1999 | Mulla |
| 5,872,524 A | 2/1999 | Iida |
| 5,872,944 A | 2/1999 | Goldrian et al. |
| 5,875,301 A | 2/1999 | Duckwall et al. |
| 5,883,621 A | 3/1999 | Iwamura |
| 5,892,929 A | 4/1999 | Welker |
| 5,901,332 A | 5/1999 | Gephardt et al. |
| 5,905,732 A | 5/1999 | Fimoff et al. |
| 5,920,267 A | 7/1999 | Tattersall et al. |
| 5,923,673 A | 7/1999 | Henrikson |
| 5,930,703 A | 7/1999 | Cairns |
| 5,935,208 A | 8/1999 | Duckwall et al. |
| 5,941,964 A | 8/1999 | Young et al. |
| 5,961,623 A | 10/1999 | James et al. |
| 5,970,234 A | 10/1999 | Jin |
| 5,974,036 A | 10/1999 | Acharya et al. |
| 5,978,854 A | 11/1999 | Fujimori et al. |
| 5,991,520 A | 11/1999 | Smyers et al. |
| 6,005,852 A | 12/1999 | Kokko et al. |
| 6,023,732 A | 2/2000 | Moh et al. |
| 6,032,211 A | 2/2000 | Hewitt |
| 6,038,625 A | 3/2000 | Ogino et al. |
| 6,055,561 A | 4/2000 | Feldman et al. |
| 6,072,772 A | 6/2000 | Charny et al. |
| 6,085,270 A | 7/2000 | Gulick |
| 6,104,706 A | 8/2000 | Richter et al. |
| 6,108,718 A | 8/2000 | Fujimori et al. |
| 6,119,243 A | 9/2000 | Garney et al. |
| 6,131,119 A | 10/2000 | Fukui |
| 6,137,777 A | 10/2000 | Vaid et al. |
| 6,138,178 A | 10/2000 | Watanabe |
| 6,138,196 A | 10/2000 | Takayama et al. |
| 6,141,767 A | 10/2000 | Hu et al. |
| 6,157,972 A | 12/2000 | Newman et al. |
| 6,160,796 A | 12/2000 | Zou |
| 6,185,632 B1 | 2/2001 | Berkema |
| 6,192,428 B1 | 2/2001 | Abramson et al. |
| 6,219,697 B1 | 4/2001 | Lawande et al. |
| 6,359,901 B1 * | 3/2002 | Todd et al. .................. 370/465 |
| 6,378,000 B1 | 4/2002 | Akatsu et al. |
| 6,389,496 B1 | 5/2002 | Matsuda |
| 6,434,117 B1 | 8/2002 | Momona |
| 6,463,550 B1 | 10/2002 | Cepulis et al. |
| 6,496,945 B2 | 12/2002 | Cepulis et al. |
| 6,522,654 B1 | 2/2003 | Small |
| 6,539,450 B1 * | 3/2003 | James et al. ................. 710/306 |

\* cited by examiner

METHOD AND SYSTEM FOR ADJUSTING ISOCHRONOUS BANDWIDTHS ON A BUS

This application claims benefit of U.S. Provisional Application No. 60/167,958 filed Nov. 29, 1999.

FIELD OF THE INVENTION

The present invention relates generally to audio, video, and audio/video interconnected systems for home and office use. More particularly, the present invention relates to a method and system for adjusting isochronous bandwidth allocations in a digital bus system.

BACKGROUND OF THE INVENTION

With the development of consumer electronic audio/video (A/V) equipment, and the advance of digital A/V applications, such as consumer A/V device control and signal routing and home networking, various types of data in various formats can now be transferred among several audio/video control (AV/C) devices via one digital bus system. However, many current systems do not have sufficient bandwidth resources to transfer and display all the different types of data at the same time.

Typical computer systems solve the bandwidth problem by increasing the bandwidth of the system bus to handle all of these forms, types and amount of data. As a result, as users request more types of information, such as in multimedia applications, the system bus has become more clogged with information other than information directly utilized and needed by the main processor.

Many computer systems incorporate at least two buses. A first bus, commonly referred to as a memory bus, is typically used for communications between a central processor and a main memory. A second bus, known as a peripheral bus, is used for communications between peripheral devices such as graphics systems, disk drives, or local area networks. To allow data transfers between these two buses, a bus bridge is utilized to "bridge," and thereby couple, the two buses together.

One example of a high-speed bus system for interconnecting A/V nodes, configured as a digital interface used to transport commands and data among interconnecting audio/video control (AV/C) devices, is the IEEE 1394 standard serial bus implemented by IEEE Std 1394-1995, *Standard For A High Performance Serial Bus*, Aug. 30, 1996 (hereinafter "IEEE 1394 standard") and related other 1394 standards.

The IEEE 1394 standard is an international standard for implementing a high-speed serial bus architecture, which supports both asynchronous and isochronous format data transfers. The IEEE 1394 standard defines a bus as a non-cyclic interconnect, consisting of bus bridges and nodes. Within a non-cyclic interconnect, devices may not be connected together so as to create loops. Within the non-cyclic interconnect, each node contains an AV/C device, and bus bridges serve to connect buses of similar or different types.

The primary task of a bridge is to allow data to be transferred on each bus independently without degrading the performance of the bus, except when traffic crosses the bus bridge to reach the desired destination on the other bus. To perform this function, the bridge is configured to understand and participate in the bus protocol of each of the buses.

Multi-bus systems are known to handle the large amounts of information being utilized. However, communication between buses and devices on different buses is difficult. Typically, a bus bridge may be used to interface I/O buses to the system's high-performance processor/memory bus. With such I/O bridges, the CPU may use a 4-byte read and write transaction to initiate DMA transfers. When activated, the DMA of a serial bus node generates split-response read and write transactions which are forwarded to the intermediate system backbone bus which also implements serial bus services.

Depending on the host system design, the host-adapter bridge may have additional features mandated by differences in bus protocols. For example, the host bus may not directly support isochronous data transfers. Also, the host-adapter bridge may enforce security by checking and translating bridge-bound transaction addresses and may often convert uncached I/O transactions into cache-coherent host-bus transaction sequences.

Each time a new device or node is connected or disconnected from an IEEE 1394 standard serial bus, the entire bus is reset and its topology is reconfigured. The IEEE 1394 standard device configuration occurs locally on the bus without the intervention of a host processor. In the reset process, three primary procedures are typically performed; bus initialization, tree identification, and self identification. Within the IEEE 1394 standard, a single node must first be established as the root node during the tree identification process in order for the reconfiguration to occur.

Isochronous data connections have one talker and one or more listeners. The talker broadcasts audio, video, or any other data format. Both the talker and listener are nodes on the digital bus system. Isochronous data is routed by channel numbers from the talker to the listener. The channel numbers are assigned to the data connections dynamically.

Each listener has an associated controller that sets up the isochronous connection between the talker and listener. The controllers signal the bus bridges (through their associated portals) to expect data having a certain bandwidth. Sometimes, the bandwidth allocated for the data being broadcast by the talker must be increased or decreased because the data format changes. For example, a talker may broadcast highly compressed video data at 25 megabits per second and then begin broadcasting lightly compressed video requiring 50 megabits per second of bandwidth.

The change in bandwidth could, of course, be signaled by immediately transmitting the data packets at the higher bandwidth. The bus bridges can detect the larger packets and requested additional bandwidth from their bus local isochronous resource managers (IRMs).

Several problems are encountered by the above described approaches. For example, a certain amount of latency is experienced during the time when the talker begins sending larger data packets until the controller allocates the additional bandwidth necessary. The latency results in lost data packets that are rejected by the digital bus system.

In prior systems, a bandwidth change indication is generally broadcast over the entire bus system because talkers do not know the bus addresses of controllers because numerous bus connections (one for each listener) may be associated with a specific talker, and each listener may be associated with a distinct controller. A reliable broadcast mechanism for sending the bandwidth change indication is difficult to implement since all nodes may not receive the indication. These missed nodes will not return an error message to the digital bus system. Furthermore, a widely broadcast message tends to flood the bus system with messages causing data congestion.

SUMMARY OF THE INVENTION

A method of adjusting the bandwidth allocated for isochronous data traffic on an interconnected data bus is disclosed. The present system uses an isochronous resource manager (IRM) to sense a bandwidth change request from a talker. The IRM instigates a bandwidth adjustment associated with the bandwidth change request to one or more bus bridge portals.

BRIEF DESCRIPTION OF THE DRAWINGS

Features and advantages of the prevention invention will be apparent to one skilled in the art in light of the following detailed description in which.

DETAILED DESCRIPTION

A method and system for adjusting the bandwidth allocated for isochronous data traffic on an interconnected data bus is disclosed. The present system uses an isochronous resource manager (IRM) to sense a bandwidth change request from a talker. The IRM instigates a bandwidth adjustment associated with the bandwidth change request to one or more bus bridge portals. As the request is disseminated throughout the bus, bandwidth allocations are adjusted at each portal until the listener controller is reached.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
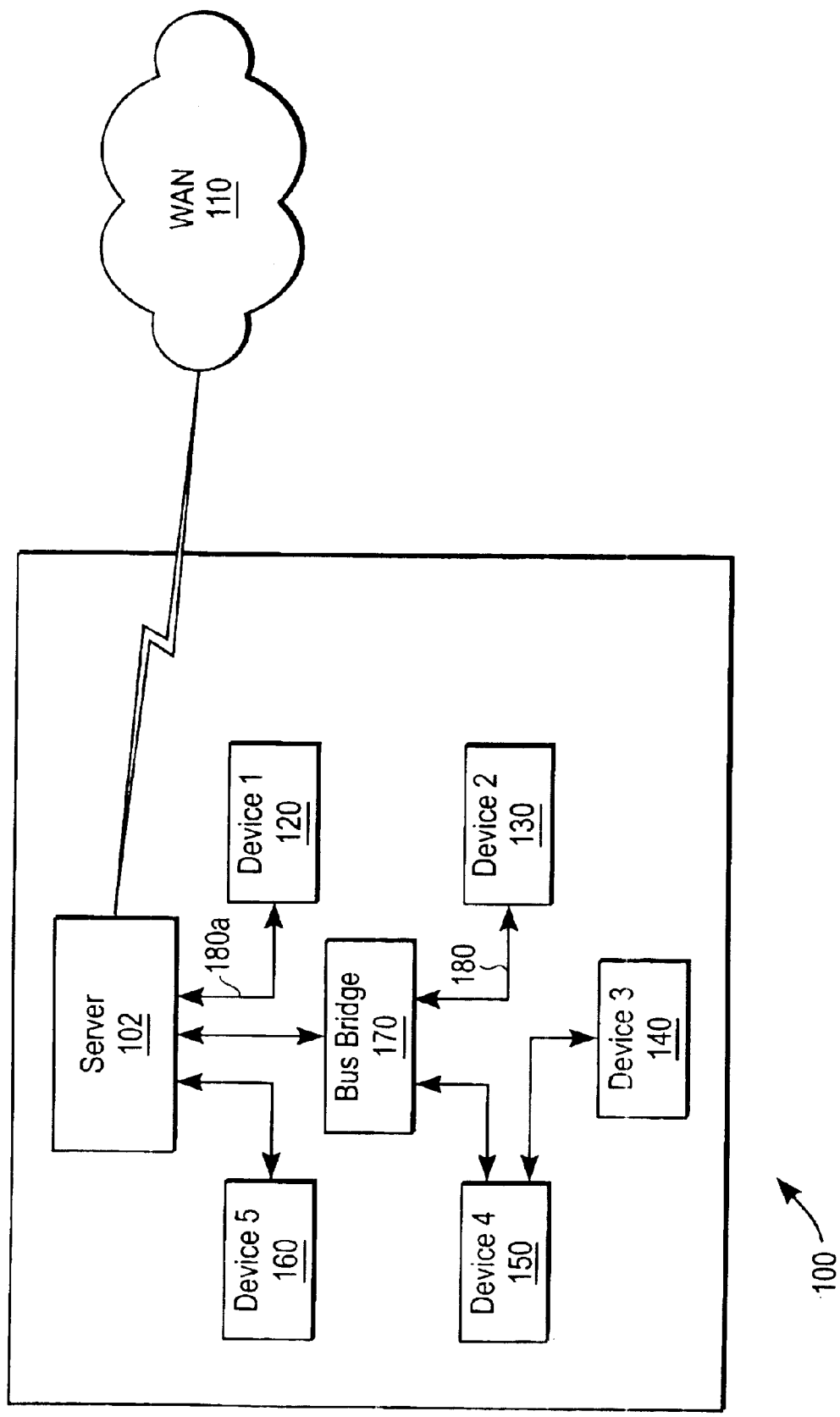
FIG. 1 is a block diagram of one embodiment for an interconnect topology.

FIG. 1 is a block diagram of one embodiment for an interconnect topology 100. Referring to FIG. 1, server 102 is connected to a wide area network (WAN) 110 and to a bus bridge 170. The bus bridge is interconnected to a number of audio, video, and/or audio/video devices, 120, 130, 140, 150, and 160. In one embodiment, the devices (120–160) are connected to bus bridge 170 via the IEEE 1394 standard serial bus. Server 102 may be any device that is capable of connection to both a bus bridge 170 and wide area network 110, such as, for example, a personal computer or a set-top box. In one embodiment, network 110 may be a wide area network, such as, for example, the Internet, or a proprietary network such as America Online®, Compuserve®, Microsoft Network®, or Prodigy®. In addition, WAN 110 may be a television communications network. Server 102 includes a network interface which communicates with WAN 110.

Topology 100 includes high speed serial bus 180a and 180. In one embodiment, serial bus 180 is the IEEE 1394 standard serial bus. Topology 100 includes various consumer electronic devices 120–160 connected via the high speed serial bus 180 to bus bridge 170. The consumer electronic devices 120–160 may include, for example, a printer, additional monitor, a video camcorder, an electronic still camera, a video cassette recorder, digital speakers, a personal computer, an audio actuator, a video actuator, or any other consumer electronic device that includes a serial interface which complies with a serial interface standard for networking consumer electronic devices—for example, the IEEE 1394 standard. Topology 100 may be contained within a home or office. Bus bridge 170 is used to connect devices 120–160 in which devices 120–160 may be physically located within different rooms of the home or office. Although the original IEEE bus standard is designed for use with a cable interconnect, any communication media may be used such as radio frequency (RF) communication or the like.

Figure 2:
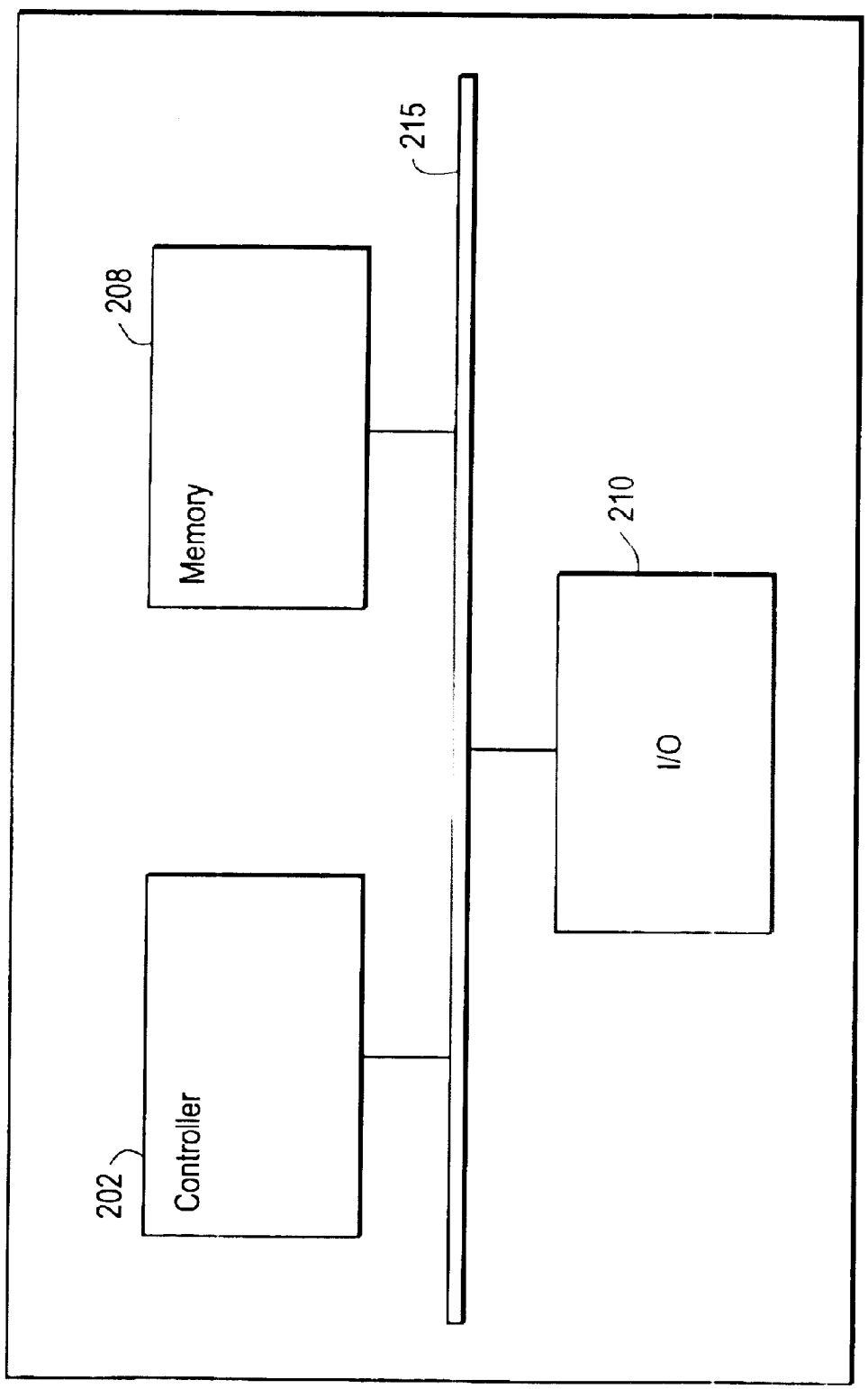
FIG. 2 is a block diagram of a device of FIG. 1.

FIG. 2 is a block diagram of a device 120. Referring to FIG. 2, device 120 may be a laser printer, digital camera, set-top box, or any other appropriate consumer electronic device capable of being connected via a high speed serial bus 180. In one embodiment, the device 120 includes a controller 202, memory 208, and I/O 210, all connected via bus 215. Memory 208 may include, for example, read only memory (ROM), random access memory (RAM), and/or non-volatile memory. I/O 210 provides connection with wide area network 110, bus bridge 170, and another peripheral device (130–160).

In one embodiment, I/O 210 is a serial bus interface that complies with a serial interface standard for networking with consumer electronic devices (120–160) and bus bridge 170 within topology 100. For example, the serial bus interface and topology 100 may use the IEEE 1394 standard serial bus. I/O 210 provides for receiving signals from and transmitting signals to other consumer electronic devices (130–160) or bus bridge 170.

Memory 208 provides temporary storage for voice and data signal transfers between outside network 110 and topology 100. In addition, memory 208 may buffer digital voice and data signals received by I/O 210 from WAN 110 before signals are transmitted onto IEEE 1394 standard bus 180.

Controller 202 controls various operations of device 120. Controller 202 monitors and controls the traffic through the device 120 to and from topology 100 and WAN 110.

Device 120 I/O 210 may have one or more physical ports. A single port device discontinues the bus along the given branch of the bus, whereas devices with two or more ports allow continuation of the bus. Devices with multiple ports permit a daisy chained bus topology, even though the signaling environment is point-to-point. That is, when a multi-port node receives a packet of data, the data is detached and retransmitted to the necessary port as indicated within the data. The configuration is performed dynamically as new devices are attached and/or removed from bus 180.

The 1394 standard bus protocol is designed to support peer-to-peer transfers between devices. This allows serial bus devices to transfer data between themselves without intervention from a computer system or host system. This allows high throughput between devices without affecting the performance of the computer system. Thus, a video camera may be set up to transfer between itself and a video cassette recorder without accessing a computer system.

Figure 3:
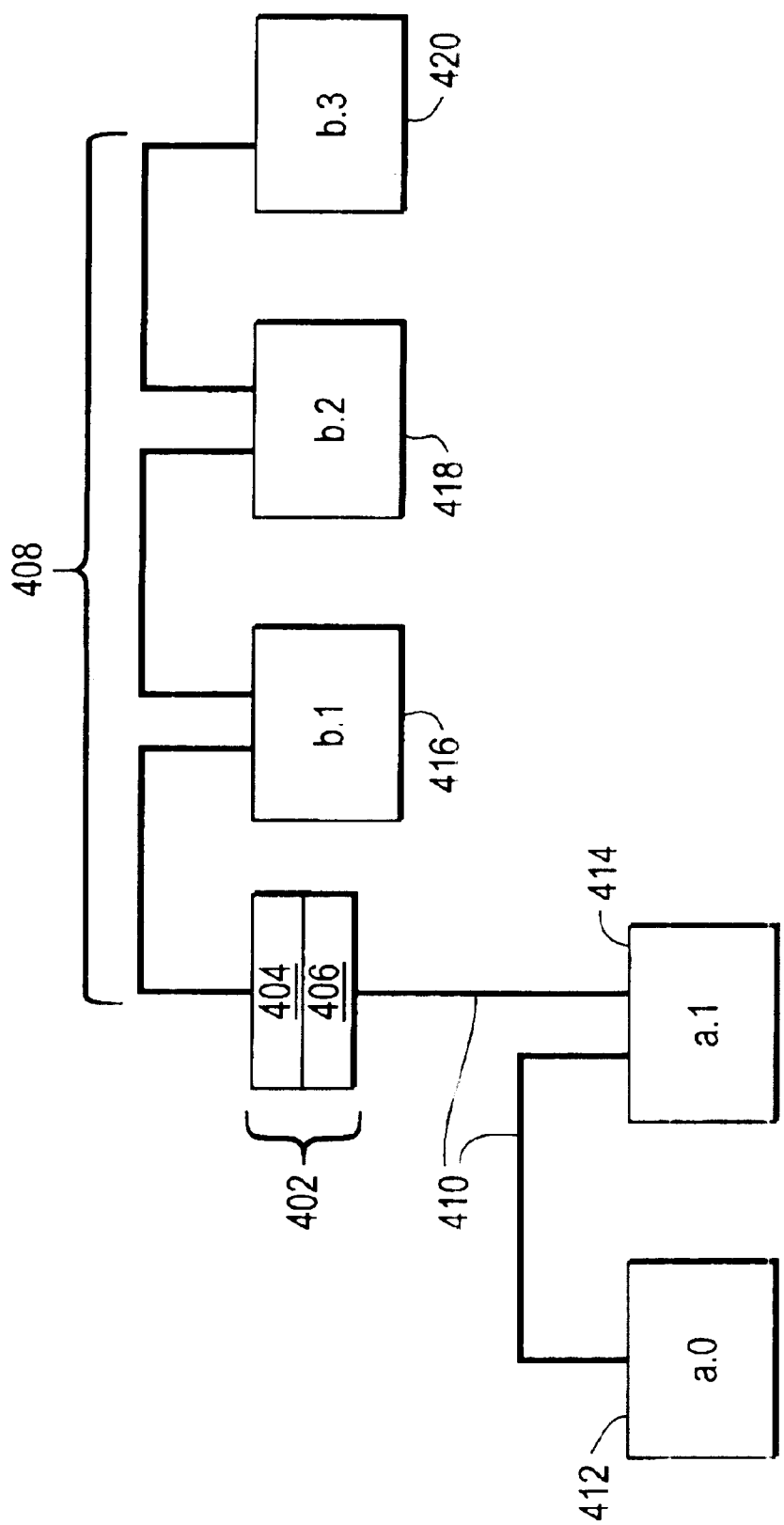
FIG. 3 is a block diagram of one embodiment for a 1394 standard bus bridge system.

FIG. 3 is a block diagram of one embodiment for a 1394 standard bridge bus system 400. Referring to FIG. 3, system 400 includes bridge 402 which connects two or more buses 408 and 410. Bus 408 and 410 may be the same or different types of buses. For example, bus 408 may be a 1394 standard serial bus and bus 410 may be a different high performance bus. The 1394 standard bus architecture limits the number of nodes or devices on a bus and supports multiple bus systems via bus bridge 402.

The control and status register (CSR) architecture, ISO/IEC 13213 (ANSI/IEEE 1212), *Information systems-Control and Status Registers (CSR) Architecture Microcomputer Buses*, defines the 1394 standard bus addressing structure, which allows approximately $2^{16}$ nodes (404, 406, 412–420). The CSR standard defines their registry, their functionality, and, where appropriate, where they appear in the address space.

Figure 4:
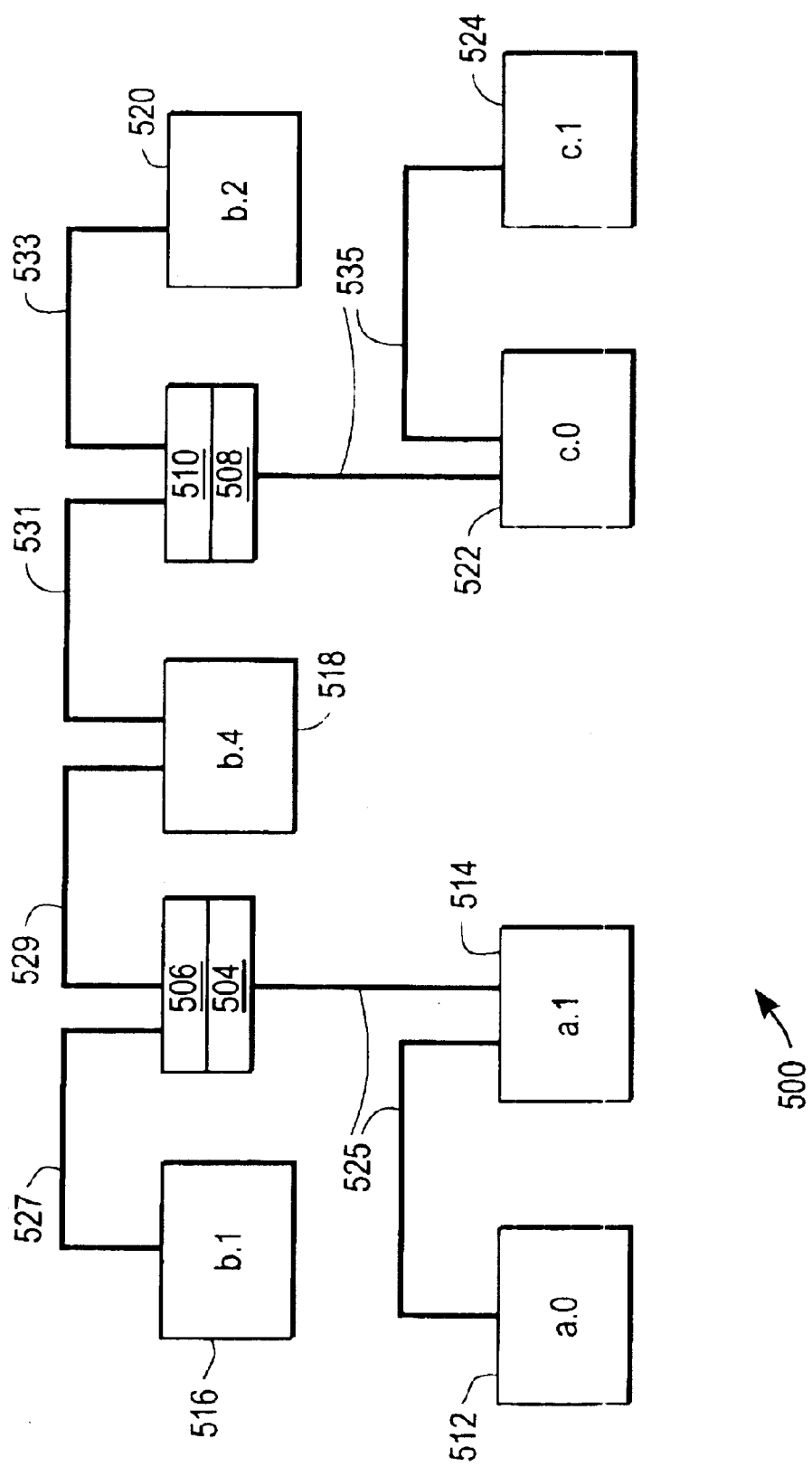
FIG. 4 is a block diagram of one embodiment for a 1394 bus bridge topology.
Figure 5:
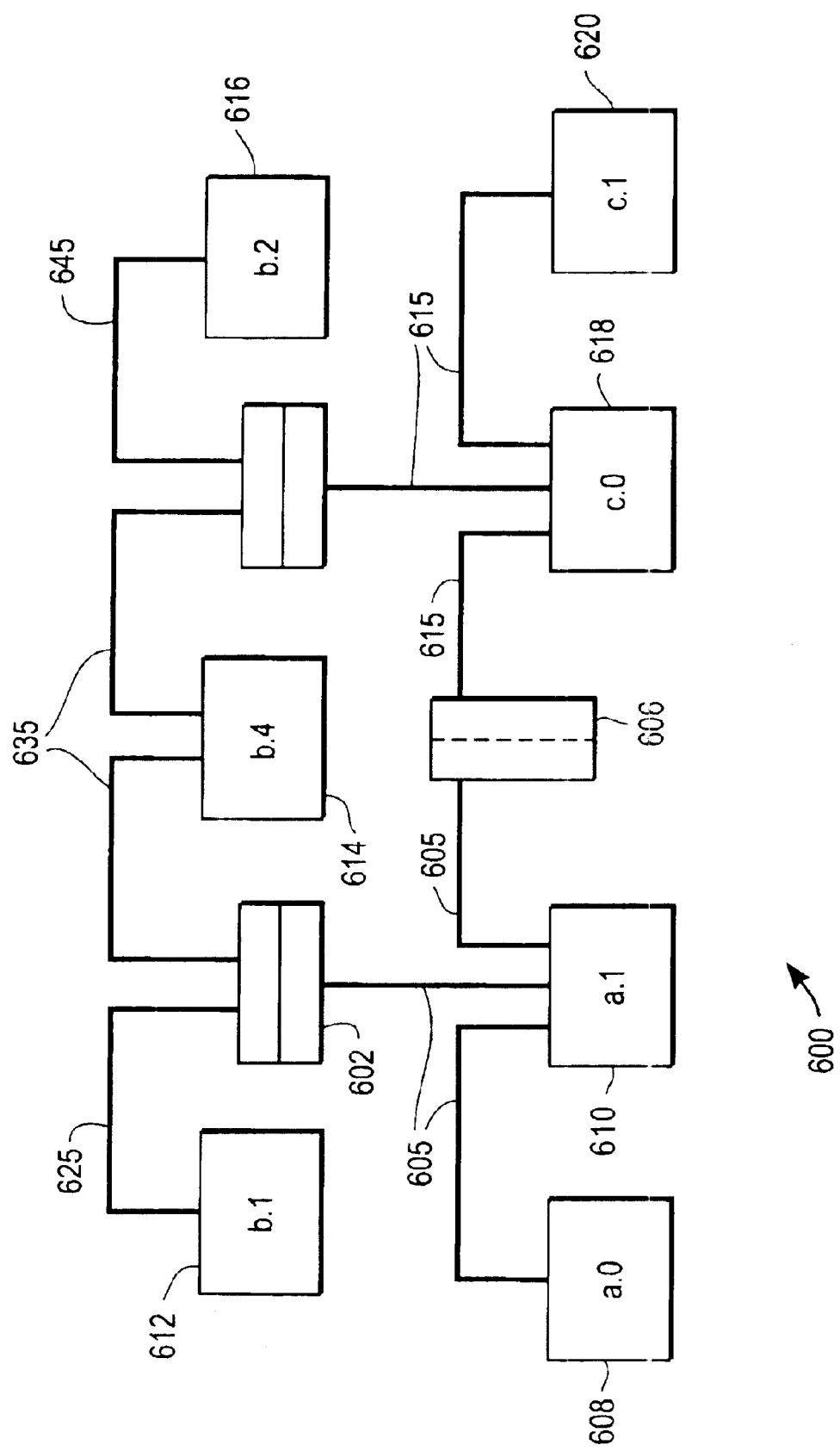
FIG. 5 is a block diagram of one embodiment for a looped bus bridge topology.

FIG. 3 is the simplest instance of a bus topology in which the net has one bus bridge. FIG. 4 illustrates a net that may have more than one bus bridge and, when so structured, is hierarchical in nature. FIG. 5 illustrates a network whose physical topology may have loops, but whose loops are electronically disabled to generate a hierarchical structure. In the description that follows, a collection of multiple buses connected through a bus bridge is referred to as a "net".

FIG. 4 is a block diagram of one embodiment for a 1394 bridge bus topology 500. Referring to FIG. 4, topology 500 has one prime portal 504 and one or more alpha portals 506 and 508. The primary bus 525 has exactly one prime portal 504 and the secondary buses 527, 529, 531, 533, and 535 have exactly one alpha portal each—506, 508 and 510. Each bus 525–535 may have any number of secondary portals. An alpha portal is on the path to a prime portal. Any portal not a prime portal or an alpha portal is a secondary portal. The prime portal or the alpha portal may be referred to as a primary portal.

Within an interconnect topology 500, the bridge portal with the largest portal ID identifier is elected to become the prime portal 504. In an alternate embodiment, the bridge portal with the smallest portal ID identifier is elected to become the prime portal 504. Each portal appears as a node on its attached bus. The bus with the prime portal 504 is termed the primary bus 525 and other buses 527–535 are termed secondary buses. On secondary buses 527–535, the bridge portal that leads to the primary bus 525 is called the alpha portal (506, 508). After a bridge bus interconnect is configured, any node within the interconnect may be accessed by its unique 16-bit node identification address. The node identification address contains the bus ID and the local ID components. Referring to FIG. 4, the bus identification IDs of nodes 512–524 are indicated by the letters a, b, and c and the local ID is indicated by the numbers 0–4.

Alpha portal 504 506 is responsible for rejecting missed address asynchronous data packets by accepting these requests and returning error reporting responses. The previous and current prime and alpha portal identifiers are used to classify nodes when an interconnect topology changes, and the alpha portal is the isochronous clock reference for other nodes on the bus.

Bus bridge topology 500 may change and be established dynamically during operation of bus bridge system 500. In one embodiment, the bus bridge topology 500 is established during net refresh. Within topology 500, portals selectively route packets. Asynchronous routing tables are stable until topology 500 changes during a net refresh or net reset operation. Asynchronous routing tables are dynamic and are changed by their asynchronous connect and disconnect operations of the protocols.

FIG. 5 is a block diagram of one embodiment for a looped bus bridge topology 600, in which the bus identification IDs of nodes 608–620 are indicated by the letters a, b, and c and the local ID is indicated by the numbers 0–4. Referring to FIG. 5, during node addition, portal 606 may be added to the topology 600 forming a loop. Thus, a path exists from a0–b4 through c0 back to a0. During initialization, the redundant portal 606 is disabled so that a hierarchical bus bridge topology remains.

Figure 6:
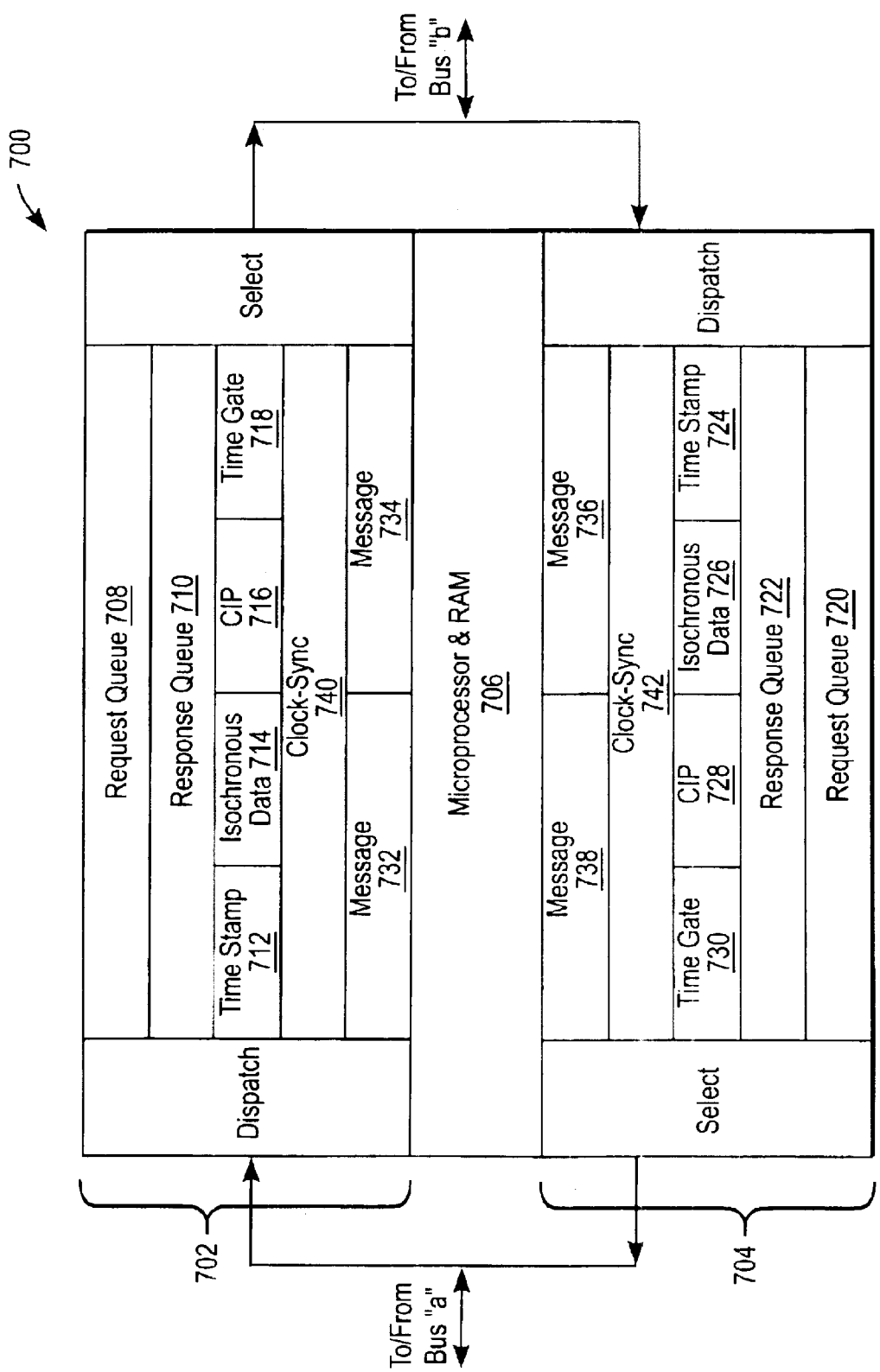
FIG. 6 is a block diagram of one embodiment for bus bridge components.

In an alternate embodiment, cyclical net topologies may be allowed. In this alternate embodiment, software routines may partially activate the redundant bridge 606 and allow a shortest path routing between nodes. For example, traffic between bus a 605 and bus c 615 may be efficiently routed without introducing deadlocks. (FIG. 6 is a block diagram of one embodiment for bus bridge components 700. Referring to FIG. 6, bus bridge components 700 are maintained within each portal in which bus "a" to bus "b" components 702 and bus "b" to bus "a" components 704 are independently maintained. Components 700 also contains shared microprocessor and RAM 706.

Asynchronous and isochronous packet transfers may not acquire a bus at the same time. Therefore, asynchronous packets are placed in request queues 708, 720 and response queues 710, 722. The asynchronous packets are selected for transfer at times when isochronous packets are not being transferred. Isochronous packets are received and time stamped 712, 724. Time gates 718, 730 release the isochronous packets 714, 726, together with common isochronous packet (CIP) headers 716, 728, at fixed times. Routing tables select which asynchronous and isochronous packets are accepted and queued for adjacent bus delivery.

Topologies may share physical buffer space rather than implementing physical distinct stacks subject to the following: bus "a" to bus "b" and bus "b" to bus "a" queues operate independently, response processing is never blocked by queued requests, and asynchronous subactions and isochronous packets are forwarded independently. Topologies may block a request behind the previously queued response without generating potential deadlocks; however, requests and responses are processed independently.

Isochronous routing decisions are made by checking the isochronous packet's channel number. Accepted packets are converted and retransmitted on the adjacent bus with newly assigned channel numbers, speeds, and CIP-header and, when a CIP-header is provided, time-stamp parameters 716, 728 from the CIP-header. CIP-headers may be pre-appended to some isochronous packets to further describe their format and function and desired presentation time. When the packets incur delays while traversing through a bridge, then presentation time must be adjusted to compensate for this delay. CIP headers are defined in ISO/IEC 61883 specification. Isochronous packets received in cycle n are forwarded to the adjacent bus in cycle n+k where k is an implementation dependent constant. Messages may be passed around one bus or pass through a bridge by writing to a standardized message location 732, 734, 736, 738 on a bridge's portal. This allows bus-interconnect topologies to be restored while freezing, or discarding when necessary, previously queued subactions.

Distribution of clock-sync information 740, 742 from the primary-bus source is performed by placing calibration information in isochronous-clock pseudo queues before forwarding this information to the clock master on the adjacent portal. In one embodiment, clock-sync information flows from the primary bus downward, so that only one clock-sync pseudo queue may be required.

In support of bus bridges, each node has two node ID addresses: physical ID address and virtual ID address. A physical node ID has a $3FF_{16}$ valued bus ID; a virtual node ID has smaller bus ID addresses. In the absence of bus bridges, all nodes are accessed through their physical addresses. In the presence of bus bridges, the physical address is used to configure the node and the virtual address is normally used thereafter.

Directed-asynchronous routing decisions are made by checking the destination ID addresses of pass-through packets. Accepted packets are directly routed to the bridge's opposing port. In addition, an asynchronous quarantine is maintained which selectively enables forwarding of a request sub-action based on the local identification of a bus-local requester. A set of legacy bits identifies local nodes which requires specific processing of sourced requests and returning responses.

Figure 7:
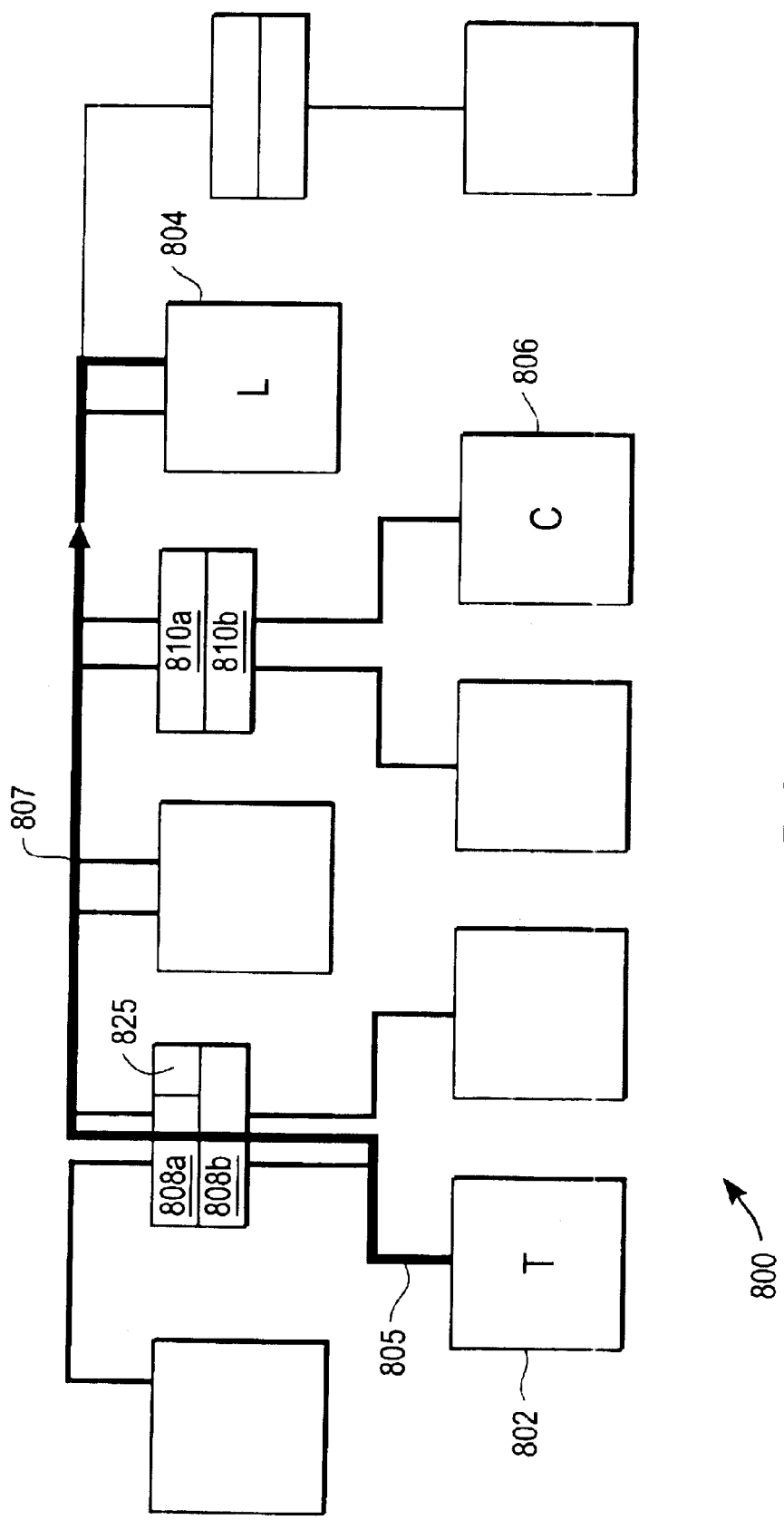
FIG. 7 is a block diagram of one embodiment for bus bridge isochronous transfer.

FIG. 7 is a block diagram of one embodiment for bus bridge isochronous transfer. Referring to FIG. 7, isochronous connections involve one talker 802 and one or more multiple listener 804/controller 806 pairs. Isochronous packets are accepted based on the current channel identification and are retransmitted on the adjacent bus with a new channel ID. A controller 806 establishes an isochronous connection. The isochronous connection enables communication between talker 802 and listener 804. An isochronous connection may be made between a single talker 802 and multiple listeners 804.

Isochronous non-overlaid connections proceed as follows: controller 806 sends a message to the final portal 810*a* in the path towards listener 804. If necessary, portal 810*a* forwards the message to the first portal on the path between the listener 804 and talker 802 (in this case, portal 808*a*). Portal 808*a* acquires isochronous resources from IRM 825 on its bus. IRM may be located within portal 808*a* or any other node. The message is forwarded towards the talker bus 805, which results in the message being received by portal 808*b*. Portal 808*b* acquires the isochronous resources in IRM 825 and updates the oPCR within talker 802. The message is forwarded back toward listener 804, which results in it being received by portal 808*a*. Portal 808*a* updates the iPCR on listener 804 so that it listens to the correct channel. Portal 808*a* forwards a message-complete indicator to controller 806.

In one embodiment, a disconnect message is sent from controller to portal 810*b*. Portal 810*b* forwards the message to portal 808*a* which updates the iPCR on listener 804 and releases the IRM resources associated with bus 807. The message is forwarded to portal 808*b*. The oPCR of talker 802 is updated in order to stop transmission. Portal 808*b* updates the IRM resources associated with bus 805. A completion message is then sent from portal 808*b* to controller 806.

In an alternate embodiment, controller 806 sends a disconnect message toward listener 810*a*, which results in the message being received by portal 810*a*. Portal 810*a* forwards the message to portal 808*a* (the talker side portal of listener 804). Portal 808*a* forwards the message towards talker 802, which results in the message being received by portal 808*b*. Portal 808*b* updates the oPCR of talker 802 in order to stop transmission. Portal 808*b* accesses IRM 825 to release isochronous channel and bandwidth resources associated with bus 805. Portal 808*b* forwards the message toward listener 804, which results in the message being received by portal 808*a*. Portal 808*a* updates the iPCR of listener 804 in order to stop listener 804 from listening. Portal 808*a* updates the IRM isochronous resources associated with bus 807. Portal 808*a* then sends a completion message to controller 806.

Figure 8:
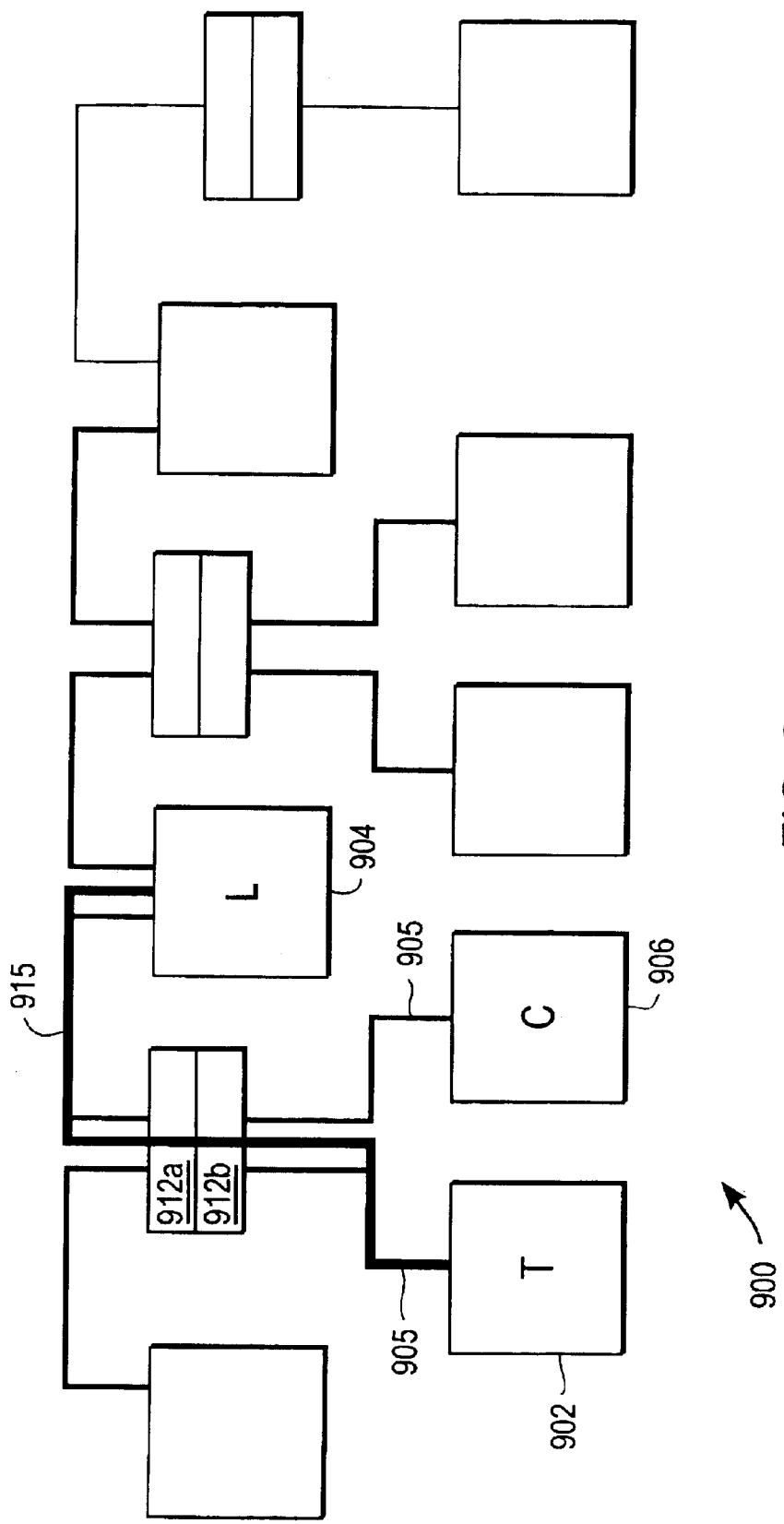
FIG. 8 is a block diagram of another embodiment for bus bridge isochronous transfer.

FIG. 8 is a block diagram of another embodiment for a bus bridge isochronous transfer. Referring to FIG. 8, a common connection isochronous transfer through an interconnect topology 900 is illustrated. Talker 902 is connected by controller 906 to listener 904. In one embodiment, controller 906 may be on the talker bus 905, listener bus 915, or other bus. Each listener 904 is associated with a controller 906. The controller 906 may be the same or different for the various listeners 904.

In the example of FIG. 8, the connection message from controller 906 is processed by portal 912*a* in which it is found to have the same stream ID. This allows the new listener to listen to the previously established channel.

In one embodiment, a disconnect message is sent from controller 906 towards listener 904, which results in the message being received by portal 912*a*. Portal 912*a* updates the iPCR of listener 904 in order for listener 904 to stop listening. Portal 912*a* decrements its use count and returns a completion message to controller 906.

Messages are exchanged between the talker 902 and listener's controller 906 when a change in the bandwidth allocated for isochronous data traffic is requested. For example, a change in bandwidth may be requested when a talker 902, sending highly compressed isochronous video data, begins sending lightly compressed isochronous video data to a listener 904. The increased data rate of video requires an increase in the allocated bandwidth for isochronous traffic of the bus reaching the talker. The message from the talker 902 to the listener's controller follows the same data path used when the isochronous connection was originally established. The system uses the isochronous data path as a way of multicast distributing of both asynchronous messages as well as isochronous data. There may be multiple listeners and each listener may be associated with a distinct controller.

Figure 9:
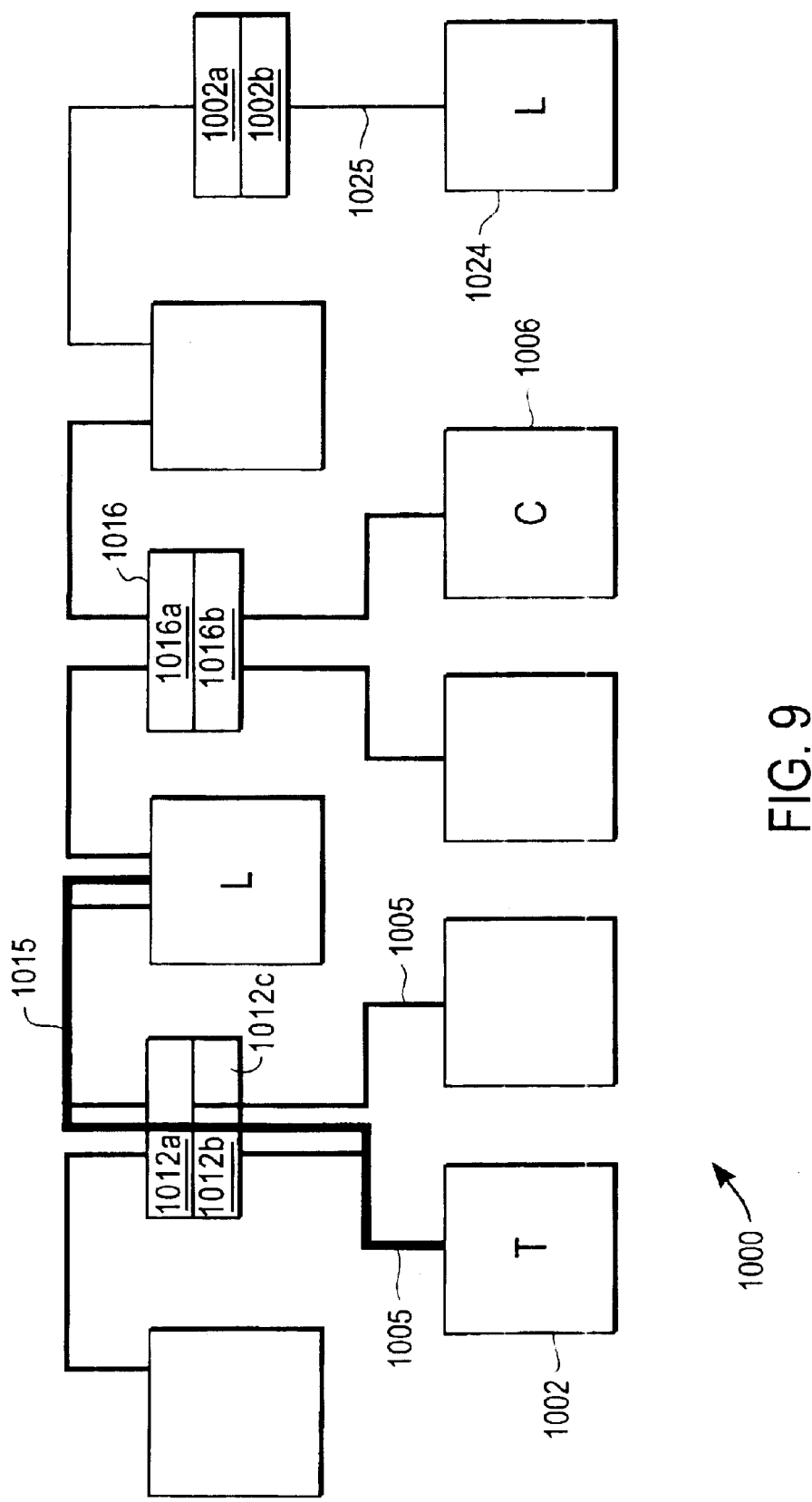
FIG. 9 is a block diagram of another embodiment for bus bridge isochronous transfer using a mechanism of partially overlaid bus connections.

FIG. 9 is a block diagram of another embodiment for bus bridge isochronous transfer using a mechanism of partially overlaid bus connections in an interconnect topology 1000. Referring to FIG. 9, partially overlaid isochronous connections or disconnections involve one talker 1002 and one or more multiple listener 1024/controller 1006 pairs. A partially overlaid isochronous connection connects a listener to a talker through an existing connection. For example, connecting listener 1024 to the portal 1016 enables listener 1024 to listen to the talker 1002 because portal 1016 is already connected to talker 1002. Likewise, the partially overlaid isochronous disconnection removes a listener from a previously established connection.

Isochronous partially overlaid connections proceed as follows: controller 1006 sends a content message to the listener bus 1012*b*. Listener bus portal is also the listener's talker-path portal. The talker-path portal 1002*b* accesses IRM, which could be on any node, to acquire isochronous bandwidth and channels. Next, portal 1002*b* forwards the content message to portal 1002*a*. When portal 1002*b* detects matching stream identifications, it increases its use count. Portal 1002*a* subsequently returns a message to portal 1002*a* indicating which channel the listener 1024 should listen. Portal 1002*b* updates the iPCR within listener 1024. Portal 1002*b* sends a message of connection completion to controller 1006.

In one embodiment, isochronous partially overlaid disconnection proceeds as follows: controller 1006 forwards a content message to listener 1024 via portal 1002*b* for disconnection or stop listening. When portal 1002*b* receives the content message, portal 1002*b* writes the iPCR within the listener 1024. Next, portal 1002*b* releases bus 1005, channel, and bandwidth. Portal 1002*b* subsequently forwards the content message to portal 1002*a*, which stops listening. Portal 1002*a* forwards the content message to portal 1012*a* in which the portal 1012*a* decrements use count. A message of disconnection completion is forwarded to controller 1006.

In another embodiment, isochronous partially overlaid disconnection proceeds as follows: controller 1006 forwards a content message to listener 1024 in which listener 1024 stops listening. The message is forwarded to talker 1002. When portal 1012*a* receives the message, it decrements use count and sends the message toward listener 1024 in which portal 1002*a* receives the message first. Once the message is received, portal 1002*a* stops listening and forwards the message to portal 1002*b*. After portal 1002*b* receives the message, it writes iPCR within listener 1024 and subsequently releases bus 1005 and IRM resources. After releasing the resources, portal 1002*b* sends a completion message to controller 1006.

Still referring to FIG. 9, a block diagram of one embodiment for adjusting bandwidth that allocates isochronous data traffic on interconnected data buses is shown. Bandwidth adjustment messages do not require any additional routing tables, since the messages flow through bus bridges in the same manner that communication connections are initially established. Furthermore, bus bridge portals need no modification to handle bandwidth adjustment requests, since the requests are handled by controllers.

The oPCR of talker 1002 indicates the current bandwidth allocated for isochronous data on the talker 1002 bus. The oPCR is updated to reflect the new bandwidth.

In one embodiment, talker 1002 senses that more bandwidth will be needed. In addition to updating its oPCR, the talker 1002 requests from IRM 1012*c* that the bandwidth be increased for bus transactions. IRM 1012*c* senses a change in bandwidth as indicated by the talker-initiated transaction oPCR and instigates a series of message transactions. The message transactions indicating a bandwidth change are sent from the talker 1002 towards the listener portal 1002*b*, through any intermediary portals 1012*a*, 1016*a*, 1002*a*. The listener portal 1002*b* forwards the message to the listener controller 1006. Finally, the listener controllers re-establish the talker 1002- to -listener 1024 connection with the revised bandwidth parameters. The same flow occurs between talker 1002 and listener 1004. Talker 1002 is connected via talker bus 1005 with IRM 1012*c*. The IRM 1012*c* is located in bus bridge talker portal 1012*b*. In alternate embodiments, the IRM 1012*c* may be an independent node connected to any point on the data bus. In one embodiment, the IRM 1012*c* detects the bandwidth change when it is accessed by the talker bus transaction. IRM 1012*c* is connected via portals 1012*a*, 1016*a*, and 1016*b* with controller 1006. The bus bridge identifies established isochronous streams using the connection's unique stream identifier, and does not forward bandwidth adjustments which conflict with that stream identifier. A listener portal 1002*b* also stores the stream identity of the data stream between talker 1002 and listener 1024 in a pilot proxy. The pilot proxy stores the communication channel identity of the data stream out of the talker 1002 and the channel of the data stream into the listener.

When the bandwidth has been changed, IRM 1012*c* informs the talker portal 1012*b*. Talker portal 1012*b* maintains knowledge of local listeners and their controllers that are paired together—that is which controller initially set-up the listener connection. Thus, the talker portal 1012*b* can signal controller 1006 that the bandwidth requirements have changed. The talker portal 1012*b* also informs neighboring intermediary portals of the bandwidth change, if the listener count indicates others are listening.

Portal 1012*b* is connected via intermediary bus 1015 with another listener 1004, and intermediary portal 1012*a*. As with the talker portal 1012*b*, intermediary portal 1012*a* forwards the bandwidth change request generated by talker 1002. Intermediary controllers are informed of the need to adjust the bandwidth of the data bus it controls via the intermediary portal. In one embodiment, multiple listeners may exist, where each listener may be associated with a distinct controller. Each controller would update its bandwidth allocations as described above. Thus all controllers between the talker 1002 and listener 1024 are informed of the bandwidth changes.

Intermediary bus 1015 is connected via listener portal 1002*b*, intermediary portals 1002*a*, 1016*a*, and listener portal 1002*b* with listener bus 1025. As with the local and intermediary portals, listener portal 1002*b* informs listener controller 1006 of the need to adjust the bandwidth of the data bus it controls via the listener portal 1002*b*. The listener portal 1002*b* stores the bus address of listener 1024 and controller 1006. One listener tag is stored in the listener portal 1002*b*. The listener tag identifies the node identity of listener 1024, the node identity of the controller 1006, and the plug identity of the listener 1024. The listener portal 1002*b* also stores the stream identity of the data stream between talker 1002 and listener 1024 in a pilot proxy. The pilot proxy stores the communication channel identity of the data stream out of the talker 1002 and the channel of the data stream into the listener.

Upon receipt of the bandwidth change request, controller 1006 initiates a standard reconnection or disconnection procedure, with the revised bandwidth parameters as discussed above. Thus, if the controller 1006 is unable to acquire the bandwidth, standard error messages are generated, just as if the controllers were unable to acquire the bandwidth during initialization of the bus connections. Furthermore controller 1006 determines how much additional bandwidth is necessary. Until controller 1006 negotiates new bandwidth parameters with their respective bus bridges, the bus bridges enforce the old bandwidth parameters.

Figure 10:
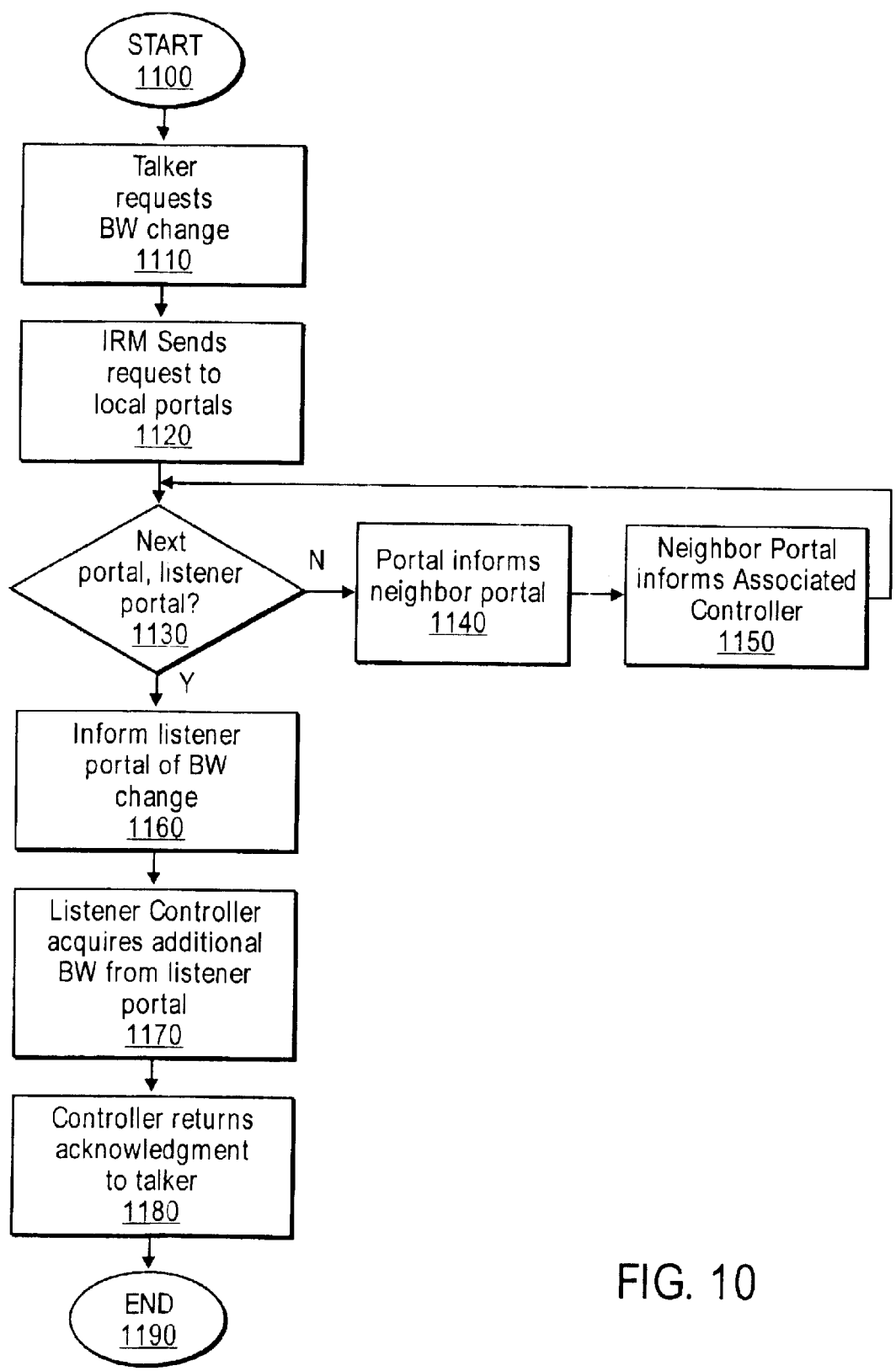
FIG. 10 is a flow diagram of one embodiment for adjusting the bandwidth allocations on interconnected data buses.

FIG. 10 is a flow diagram of one embodiment for adjusting the bandwidth allocations on interconnected data buses. A brief overview of the techniques include the talker 1002 sensing that more bandwidth will be needed. Besides updating its oPCR, the talker 1002 requests from IRM 1012c that the bandwidth be increased for bus transactions. IRM 1012c senses a change in bandwidth as indicated by the talker's request and instigates a series of message transactions. The message transactions indicating a bandwidth change are sent from the talker 1002 towards the listener controller 1006, through any intermediary portals 1012a, 1016a. The listener portal 1002b forwards the message to the listener controller 1006. Finally the listener controllers re-establish the talker 1002- to -listener 1024 connection with the revised bandwidth parameters.

Initially at processing block 1110, talker 1002 requests a bandwidth change from IRM 1012c. At processing block 1120, this bandwidth adjustment request is passed on to a talker portal 1012b. At decision block 1130 the talker portal 1012b determines if the next portal on the bus is the listener portal 1002b. If the next portal is not the listening portal, processing continues at processing block 1140. If the next portal is the listener portal, processing continues at processing block 1160. At processing block 1140, talker portal 1012b informs the intermediary portal of the bandwidth change. At processing block 1150, the bandwidth change request is passed to controller 1040 associated with the intermediary portal.

If at processing block 1130 it is determined that the next portal on the bus is the listener portal 1002b, then at processing block 1160 talker portal 1012b informs the listener of the bandwidth change. At processing block 1170, listener controller 1006 acquires any additional bandwidth required from the listener portal 1002b. At processing block 1180, listener 1006 returns an acknowledgment to the talker 1002.

In a serial bus network, an isochronous stream originates at a talker T and goes to any number of listeners L, L2, L3 . . . Each listener may have one or more controllers C1, C2, C3 . . . Each controller is associated with a separate use of the stream in the listener.

A bus bridge is a single physical instance that acts as a surrogate controller, on the bus adjacent to the listener. Although there is only one stream being listened to, multiple controllers may need to interact with the surrogates on the local bus.

Each use of the isochronous stream in the physical listener L managed by a distinct surrogate listener-controller function on the bridge, called a logical listener-controller. Each logical-listeners controller contains one set of responses associated with the stream. When any controller sets up a stream, it sets up one logical-listener controller in the physical portal next to the listener. The information connecting the actual listener to the controller is stored in the logical-listener controller. The result is managed by a distinct logical-listener controller, so that separate controllers can act independently.

To maintain the integrity of the connections, bridge portals act as agents on behalf of the connection controller. After a bus reset, these agents reacquire existing isochronous channel and bandwidth resources. This can be done in a timely fashion, even within large net topologies, because the agent is not subject to the interconnect delays through bridges.

In one embodiment, a hybrid portal-management strategy is adopted: portals manage talker-node oPCRs but do not manage listener-node iPCRs, since management is more complex and less time critical.

The isynchronous connection management can maintain isochronous communications in the presence of semistable nodeid and channel number assignments. For this reason, managed connections are identified by the EUI and plugId of the talker. The combination of these two values is called the streamId.

For unmanaged connections, the talker has no plugId, so the alpha portal (a surrogate for the talker) provides the EUI and plugId values for the streamId.

On talker may be connected to multiple listeners and positions of the route to these buses may be the same. To improve efficiency, only one isochronous channel is used on the shared portion of the connection and a use count is maintained. When the use count is larger than one, this is called an overlaid connection.

When multiple logical connections follow the same hops, these connections are "overlaid" to reduce ischronous resource requirements. An overlaid connection requires an additional up-stream counter, to avoid premature disconnections, but uses no additional ischronous channel or bandwidth.

The overlaid counter identifies the number of portals that are currently listening to the channel, and therefore may be less than 64. In a sence, the overlaid connection can "branch" on each bus and the connection count reflects the number of branches. Since each branch of an overlaid connection may itself have more branches, the total number of overlaid connections can be much larger than 64.

Establishment of an isochronous connection begins with knowledge of the isochronous payload size. In the case of a managed channel, this involves a read of the talker node's oPCR (not illustrated). The controller than has sufficient information to form the connection.

Figure 11:
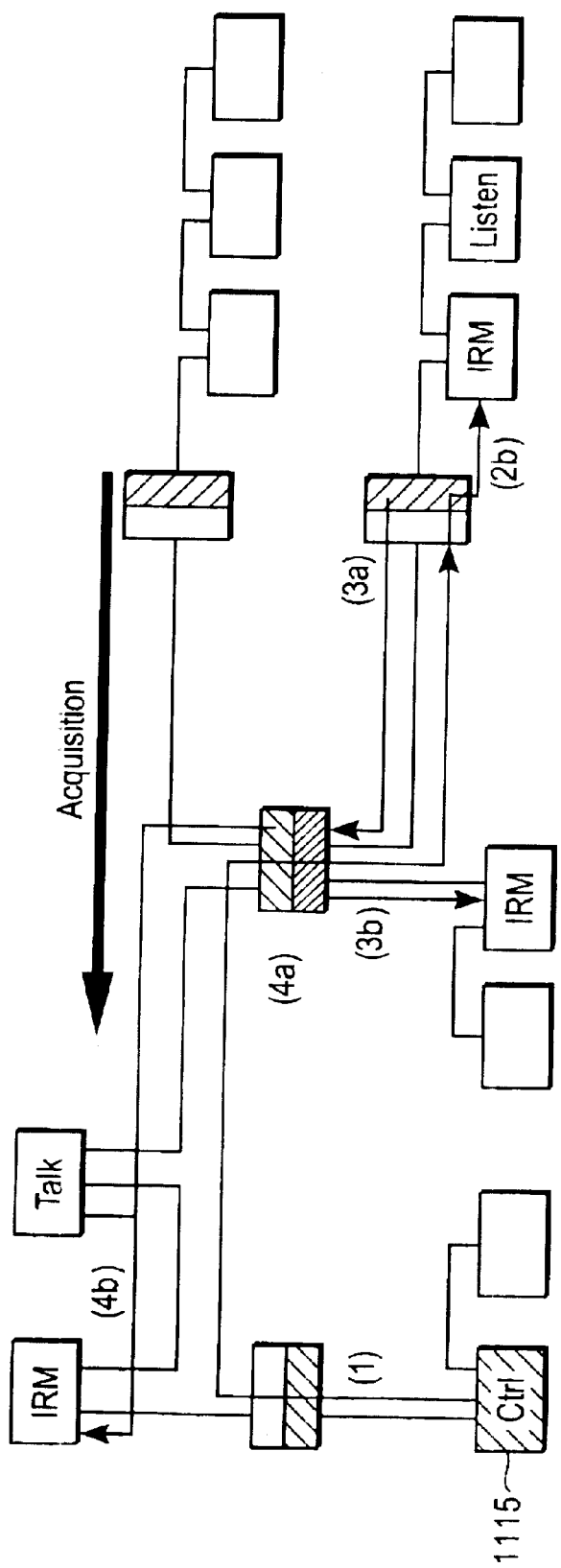
FIG. 11 is one embodiment of an isochronous connect/allocate function of a bus bridge system.

The connection formation with a message sent from the controller to the listener-bus alpha portal, as illustrated in FIG. 11. Connections procedures can involve portal-to-portal messages and portal-to-IRM transactions. The procedure is initiated when controller 1115 sends a connection message to the listener-bus alpha portal. Acquisition then occurs when the listener-bus alpha portal allocates necessary isochronous resources. A handoff occurs when a connection message is sent to the adjacent talker-side portal. Acquisition occurs when the talker-side portal allocates necessary isochronous resources. An internal handoff occurs when the connection message is sent to the adjacent talker-side portal. Another acquisition occurs when the message-target portal allocates necessary isochronous resources.

Figure 12:
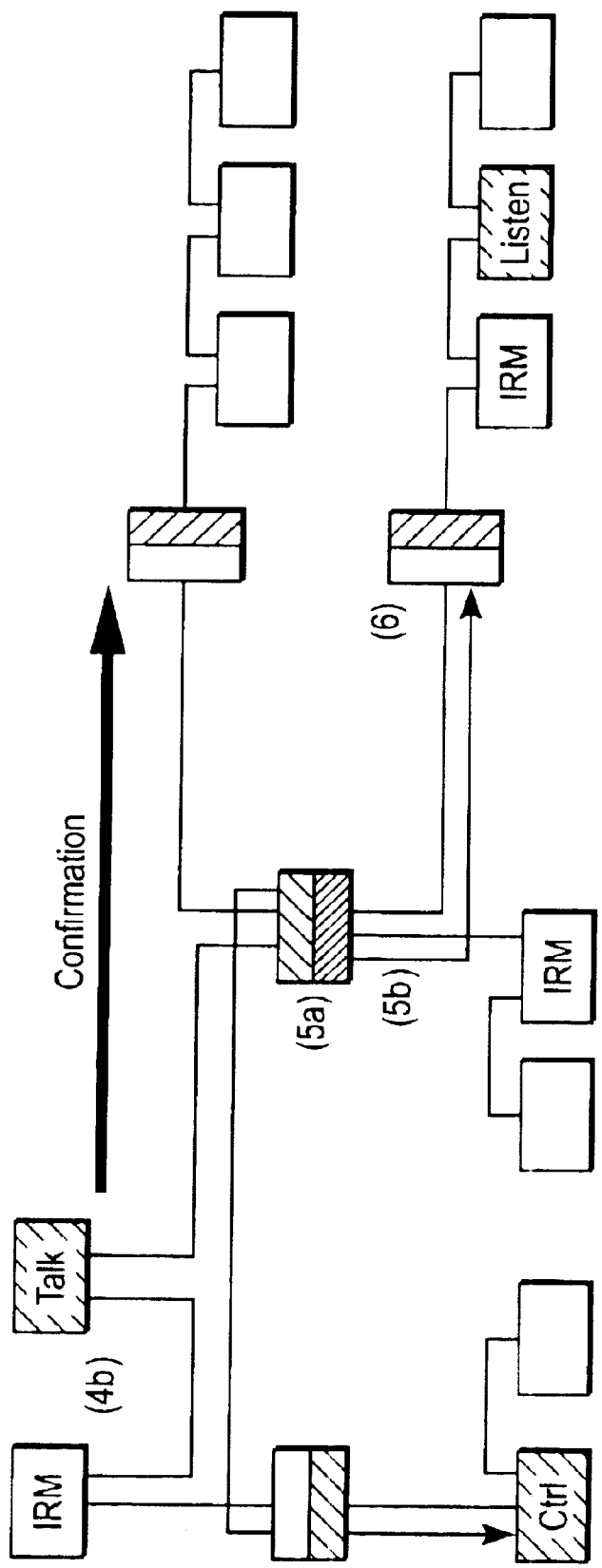
FIG. 12 is one embodiment of an isochronous connect/confirm function of a bus bridge system.

Connection confirmation flows in the opposite direction, as illustrated in FIG. 12. Confirmation messages commit speculatively allocated resources and communicate channel numbers, as follows: Internal confirmation occurs when the confirmation message is sent from talker's alpha portal towards the listener. The confirmation message sent from onward towards the listener. The confirmation is completed when the listener-side portal returns connection-completion status to the controller.

Figure 13:
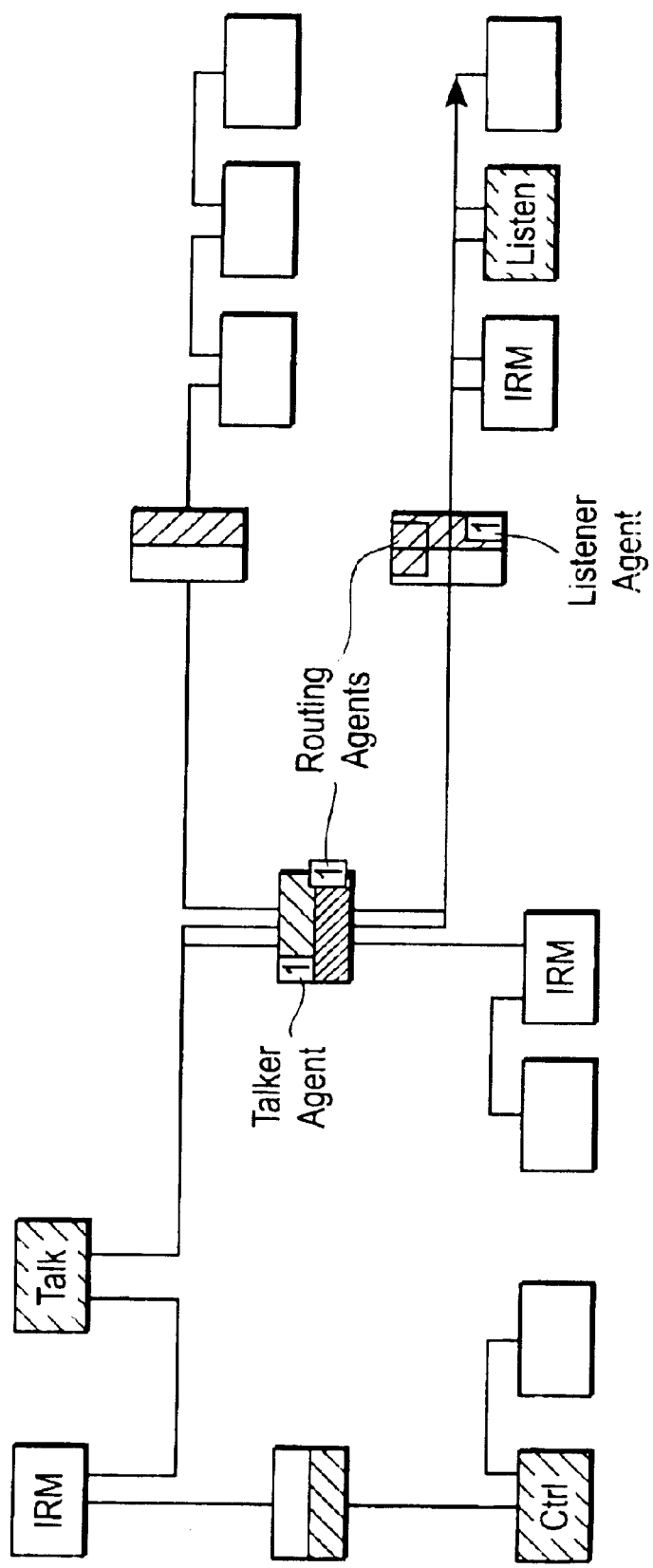
FIG. 13 is one embodiment of a nonoverlaid connection results function of a bus bridge system.

The isochronous connection steps establish a talker agent in the talker-bus alpha portal, routing agents in intermediate bridges, and a listener agent in the listener-bus alpha portal, as illustrated in FIG. 13.

Figure 14:
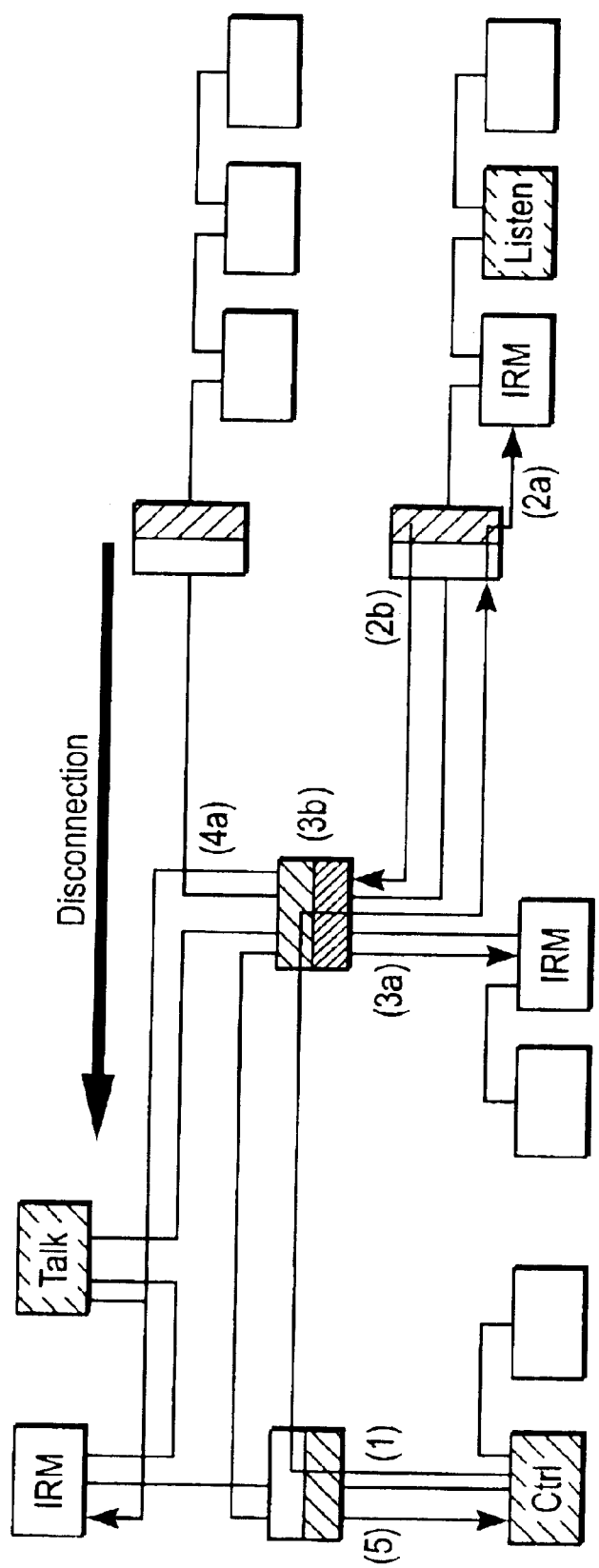
FIG. 14 is an isochronous listener disconnection function of a bus bridge system.

Isochronous disconnection also starts with the listener and involves a sequence of portal-to-portal messages and the portal-to-IRM transactions, as illustrated in FIG. 14. However, in this embodiment, no confirmation phase is required. The process is initiated when the controller sends a disconnection message to the listener-bus alpha portal. Release occurs when the message-target portal deallocates assigned isochronous resources. Handoff occurs when a disconnection message sent to the talker-side portal. Release occurs when the message-target portal deallocates necessary isochronous resources. Internal handoff occurs when the disconnection message sent to the talker's alpha portal. Release occurs when the message-target portal deallocates necessary isochronous resources. Completion occurs when the message-target portal returns disconnection-completion status to the controller.

Figure 15:
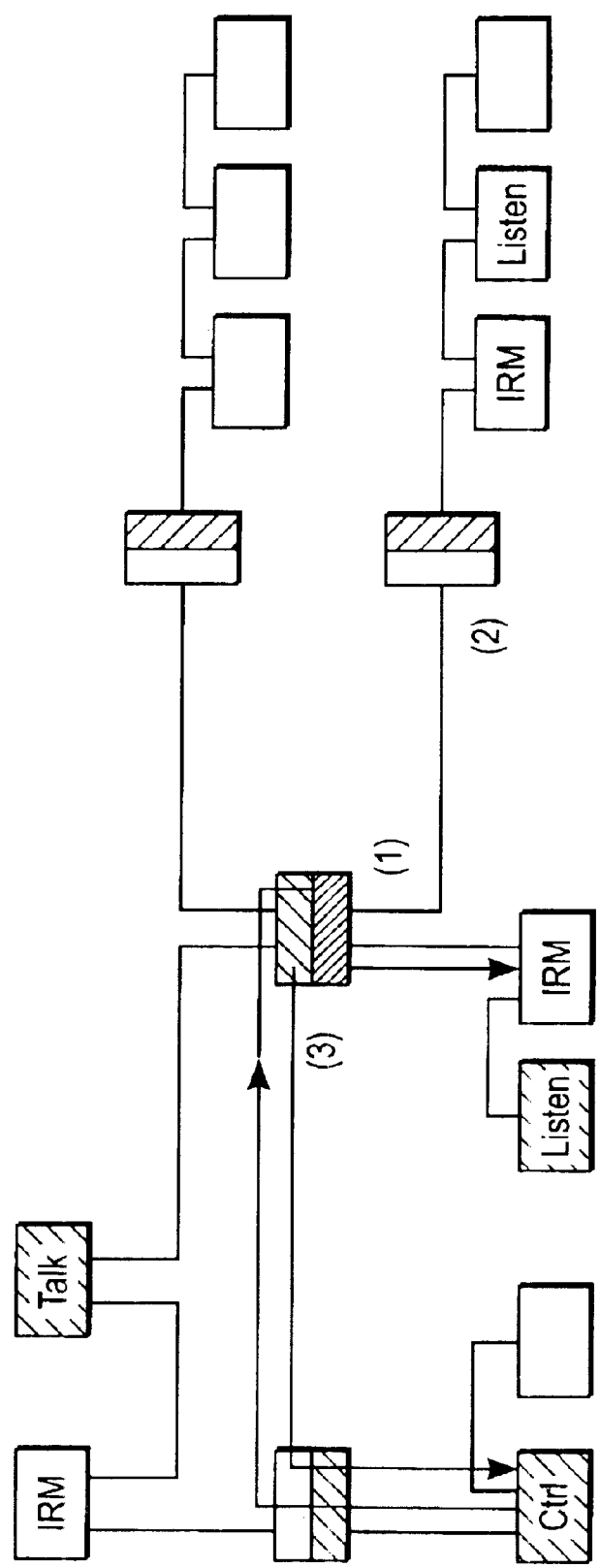
FIG. 15 is one embodiment of a fully overlaid connection function of a bus bridge system.

A fully overlaid connection completes quickly, sharing the previously acquired isochronous resources, as illustrated in FIG. 15. Connection procedures involve portal-to-portal messages and portal-to-IRM transactions. The process is initiated when the controller sends a connection message to the listener-bus alpha portal. Handoff occurs when the connection message sent to the talker-bus alpha portal, using internal-bridge communications. This has the effect of incrementing the routing agent's connections count. Completion occurs when the listener-bus alpha portal returns connection-completion status to the controller.

The isochronous connection steps establish a listener agent in the listener-bus alpha portal, and increments the count in the overlaid routing agent, as illustrated in FIG. 13 discussed above.

Figure 16:
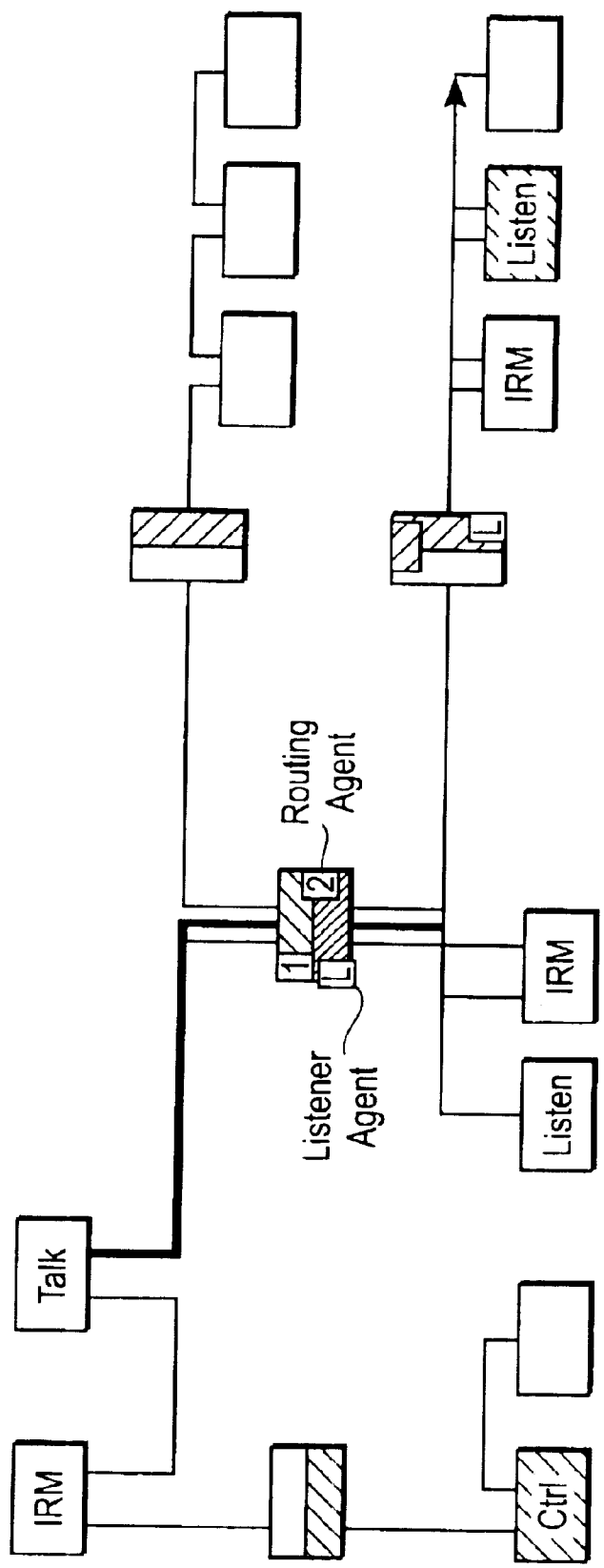
FIG. 16 is one embodiment of an isochronous connection results function of a bus bridge system.

Fully overlaid isochronous disconnection and connection steps involve a similar sequence of portal-to-portal messages and portal-to-IRM transactions (see FIG. 16), such as initiation, which is when the controller sends a message to the listener-bus alpha portal, releases the listener agent. Handoff, which is when a disconnection message passed to the talker-side portal, using internal communications. This has the effect of decrementing the routing-agent's connections count. Completion, which is when the routing agent returns disconnection-completion status to the controller.

Figure 17:
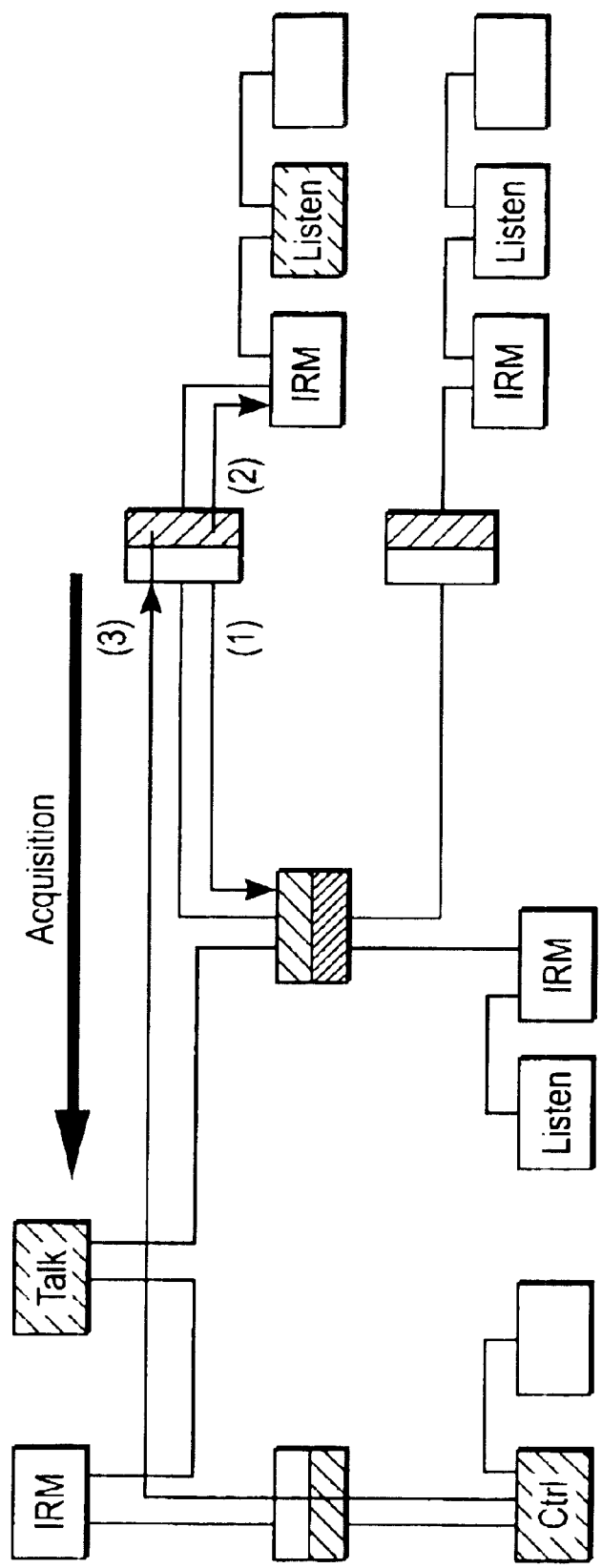
FIG. 17 is one embodiment of a partially overlaid connect/allocate function of a bus bridge system.

A partially overlaid connection involves resource allocations on the nonoverlaid segments, as illustrated in FIG. 17. Connection steps involve portal-to-portal messages and portal-to-IRM transactions, specifically: initiation (the controller sends a connection message to the listener-bus alpha portal); acquisition (the listener-bus alpha portal allocates necessary isochronous resources); and handoff (the connection message sent to the talker-bus alpha portal, with the effect of incrementing the talker agent's connection count).

Figure 18:
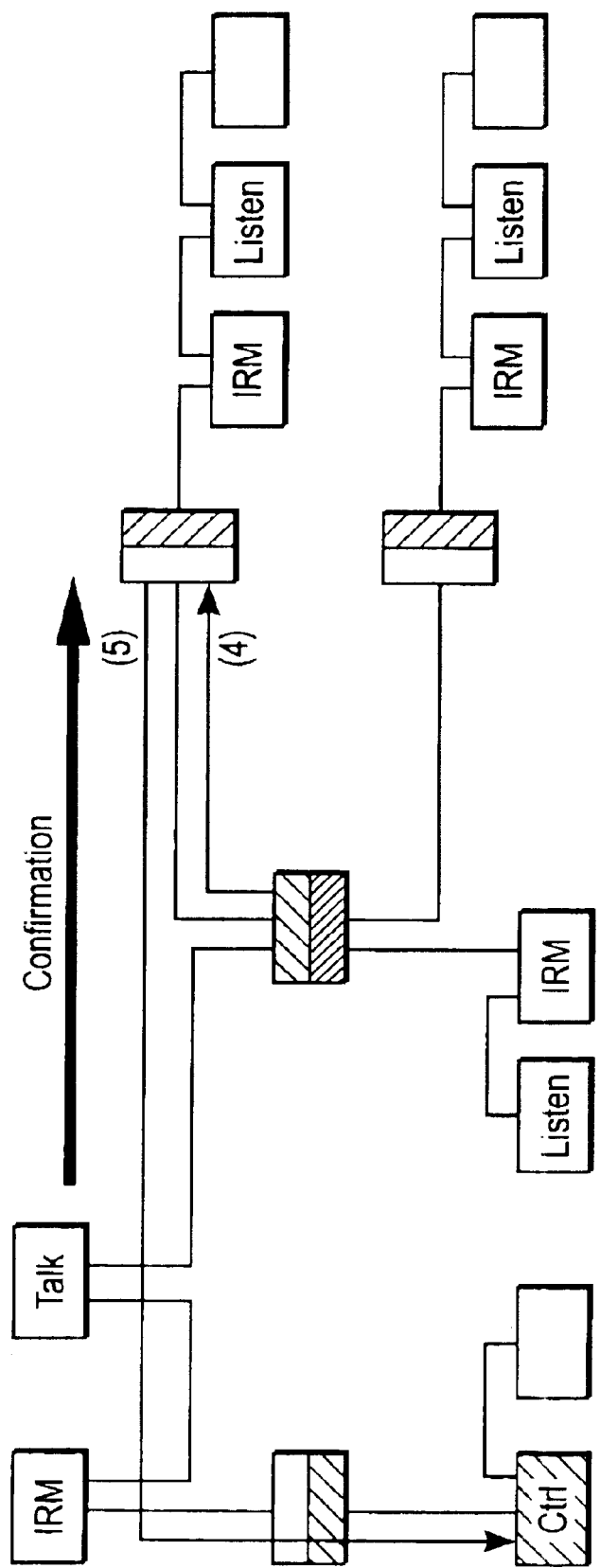
FIG. 18 is one embodiment of a partially overlaid connect/confirm function of a bus bridge system.

A partially overlaid disconnection involves releasing resources on the nonoverlaid segments, as illustrated in FIG. 18. Connection steps involve portal-to-portal message and portal-to-IRM transactions, specifically: confirmation (a confirmation message is sent from talker-bus alpha portal towards the listener); and completion (the listener-bus alpha portal returns connection-completion status to the controller.

Figure 19:
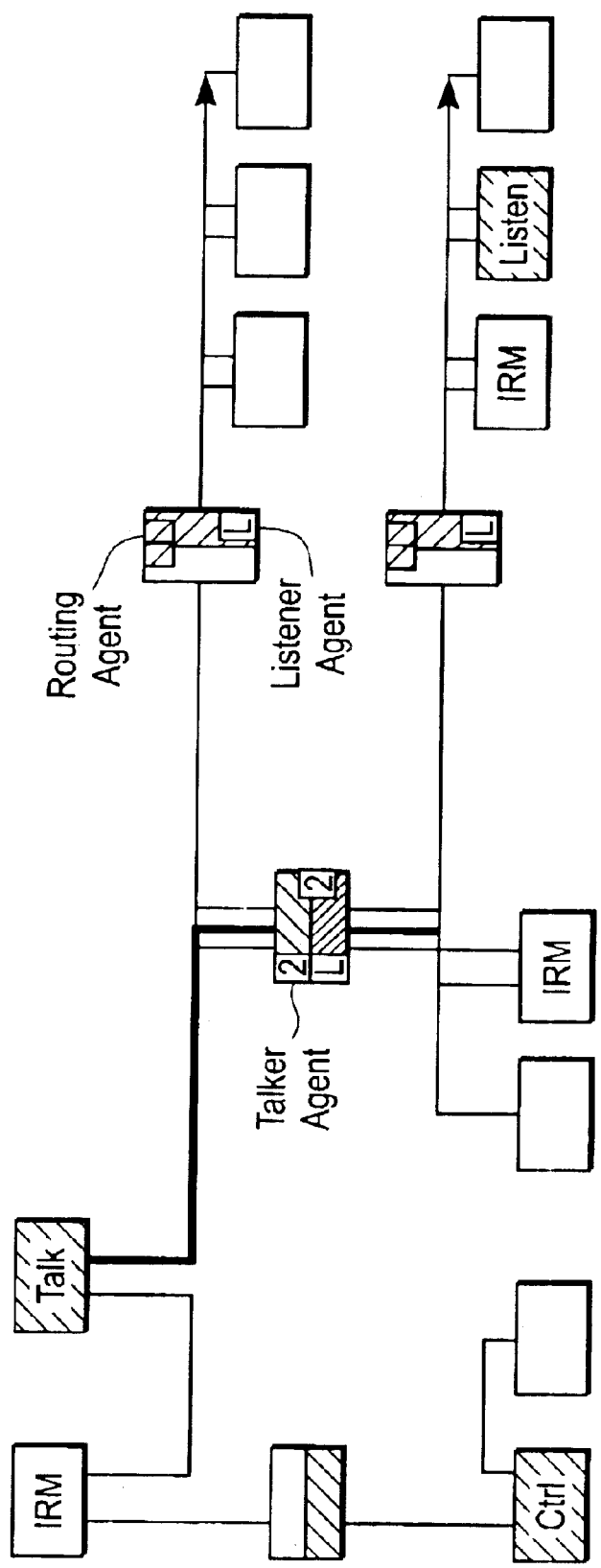
FIG. 19 is one embodiment of an isochronous connection results function of a bus bridge system.

The isochronous connection steps establish a listener agent in the listener-bus alpha portal, a routing agent on the nonoverlaid segment, and increments the connections count in the talker agent, as illustrated in FIG. 19.

Figure 20:
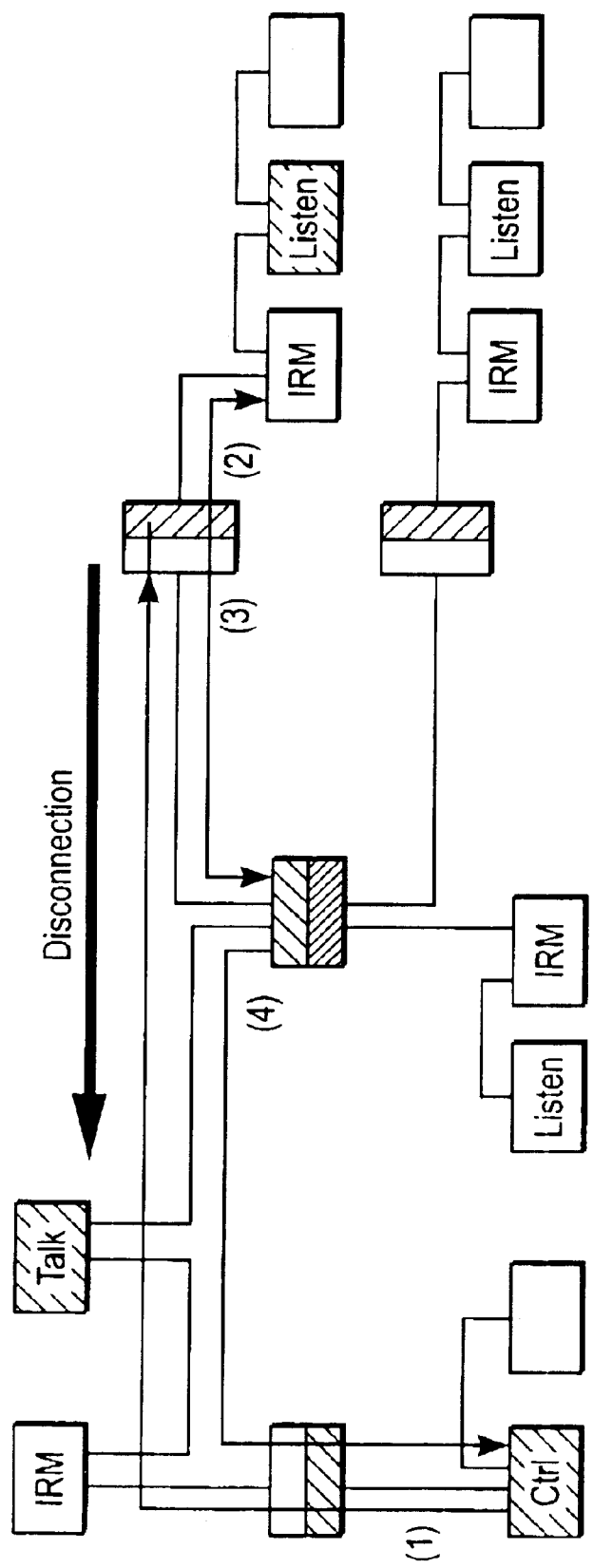
FIG. 20 is one embodiment of a partially overlaid disconnection function of a bus bridge system.

A partially overlaid isochronous disconnection involve a similar sequence of portal-to-portal messages and portal-to-IRM transactions (see FIG. 20), but no confirmation phase is required, as illustrated in FIG. 20. The process includes initiation (the controller sends a disconnection message to the listener-bus alpha portal; release (the listener's alpha portal deallocates acquired isochronous resources; handoff (the disconnection message is sent to the talker-bus alpha portal. This has the effect of decrementing the talker agent's connections count); and completion (the talker-bus alpha portal returns disconnection-completion status to the controller).

Figure 21:
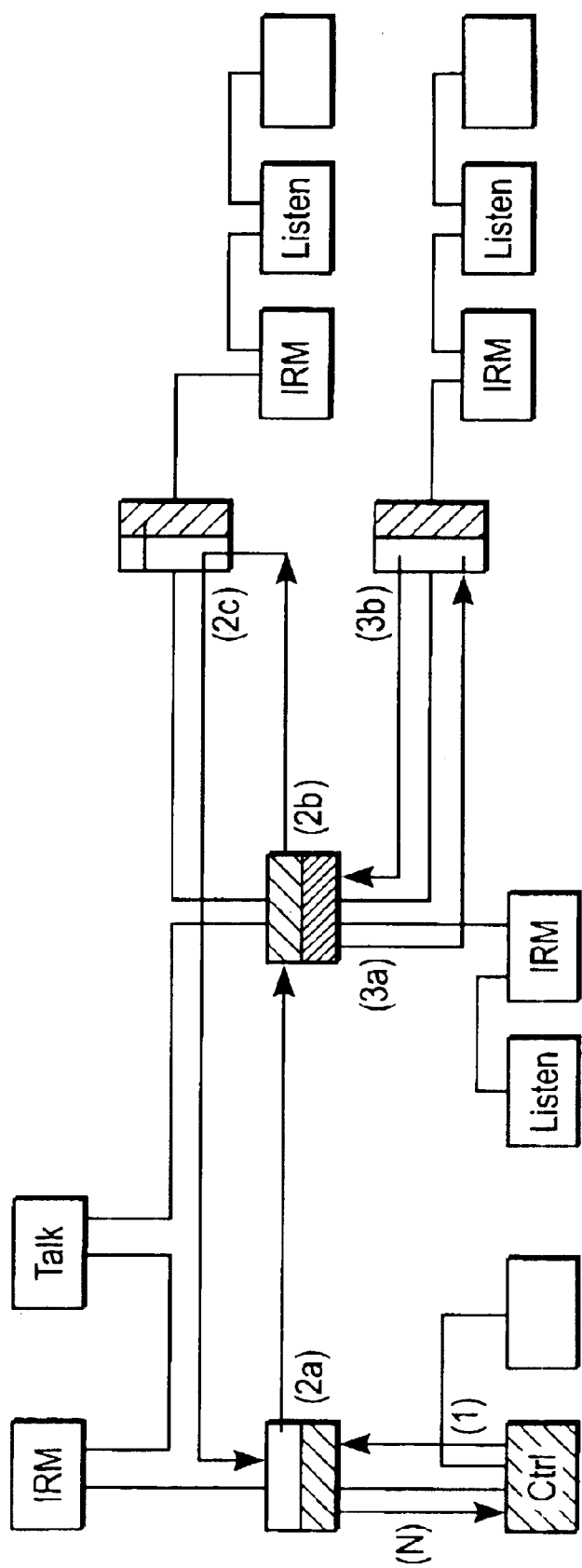
FIG. 21 is one embodiment of a talker disconnect function of a bus bridge system.

A talker can be efficiently disconnected from all of its listeners. The talker disconnection starts at the talker-bus alpha portal, which distributes disconnect messages to the other local portals, as illustrated in FIG. 21. Each active portal redistributes the disconnect messages to portals on the local bus, until all talker-side portals have been informed.

The talker-disconnect trigger involves portal-to-portal messages, as shown in FIG. 21. The process includes initiation, (the controller sends a disconnect-all message to the talker-bus alpha portal; distribute (the message target distributes the disconnect-all message to other bus-local portals); redistribute (the talker-local portals distribute the disconnect-all message to adjacent portals, for redistribution on adjacent buses); disconnect (each talker-side portal initiates its disconnection); and completion (the talker-bus portal returns disconnection-completion status to the controller).

One of the reasons for invoking a bus reset is to resolve inconsistent or ambiguous IRM-managed isochronous resource allocation. The talker-side portal (as opposed to possibly remote controller) assumes this obligation, allowing resources to be relaimed in a timely fashion, and informs other local-bus portals of isochronous channel changes (if any).

Figure 22:
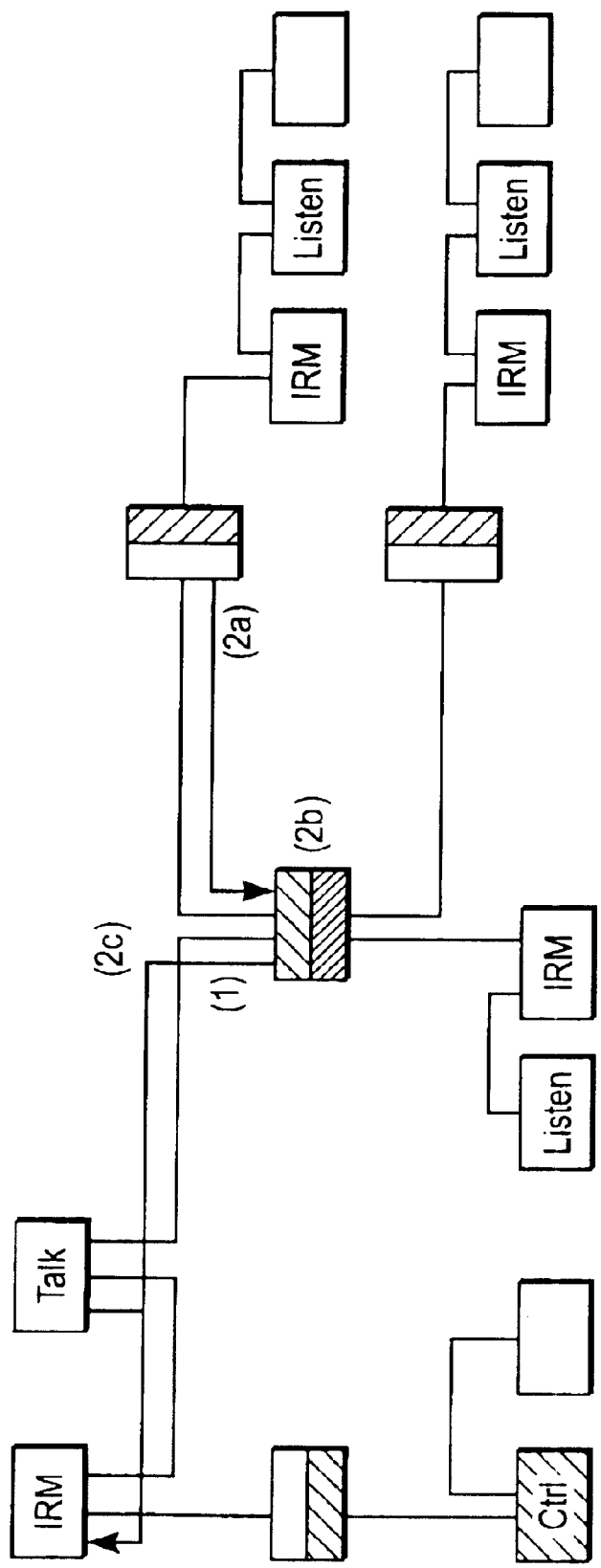
FIG. 22 is one embodiment of a bus-reset recovery, talker bus function of a bus bridge system.
Figure 23:
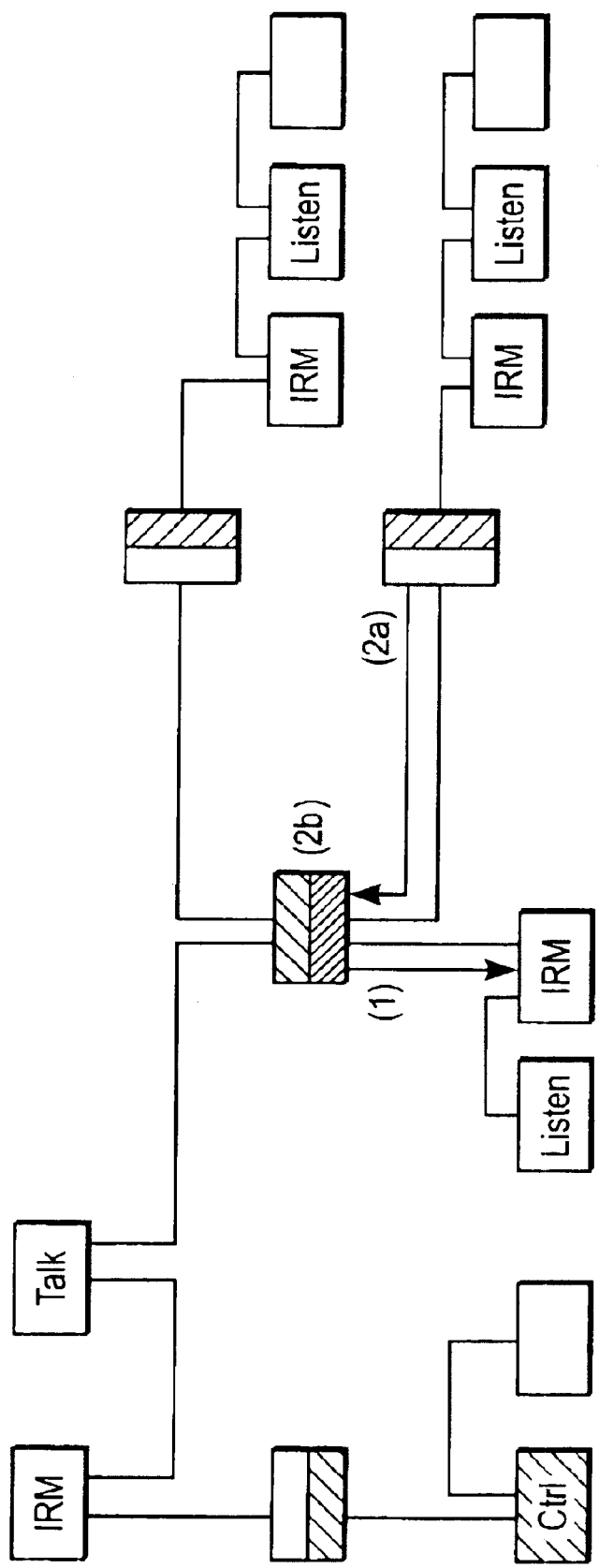
FIG. 23 is one embodiment of a bus reset recovery, nontalker buses function of a bus bridge system.

After a bus reset, the talker agent (or talker-side agent) is responsible for reallocating bus-local isochronous resources, to prevent their loss, as illustrated in FIG. 22. Also, listener agents and listener-side routing agents are responsible for reactivating their connection with their local talker-side agent, to release the talker in the absence of listeners. The process may include recovery (the talker-bus alpha portal(s) reacquire isochronous resources, changing the channels as necessary); and reactivate (local listener agents reactivate their connection with the talker agent on the talker-bus alpha portal. Their response returns the (possibly changed) channel number). Similar sets of bus-reset recovery operations are performed when a reset occurs on a connected nontalker buses, as illustrated in FIG. 23.

One of the reasons for invoking a net refresh is to resolve inconsistent of ambiguous talker-side-portal manages isochronous resource allocations. The remote talker-side portals (as opposed to possible multiple controllers) assume this obligation, allowing resources to be reclaimed in a timely fashion.

After receiving an isoch_inconsistent event, listener nodes are responsible for pinging their talker-side routing agent or (when on the talker bus) their talker agent. Some of these communications involve internal bridge communications, but some of these also appear on the bus.

The specific arrangements and methods herein are merely illustrative of the principles of this invention. Numerous modifications in form and detail may be made by those skilled in the art without departing from the true spirit and scope of the invention.

What is claimed is:

1. A method of adjusting bandwidth allocated for isochronous data traffic on interconnected data buses, comprising:

sensing a bandwidth change request from a talker by an isochronous resource manager (IRM);

instigating a bandwidth adjustment associated with the bandwidth change request from the IRM to one or more bus bridge portals; and informing a plurality of listeners of the bandwidth adjustment.

2. The method of claim 1, further comprising:

modifying bandwidth change requests in bus bridge portals, wherein channel assignments and connections are maintained.

3. The method of claim 1, wherein one or more controllers modify bandwidth allocations associated with the bandwidth change request.

4. A method of adjusting bandwidth allocated for isochronous data traffic on interconnected data buses, comprising:

providing a bandwidth change request via a talker bus bridge portal from a talker to an isochronous resource manager (IRM); and providing the bandwidth change request from the IRM to one or more bus bridge portals, wherein one or more bus bridge portals are listener portals and one or more bus bridge portals are intermediary portals.

5. The method of claim 4, further comprising providing the bandwidth change request from the listener portal and one or more listener controllers.

6. The method of claim 4, wherein the buses are compatible with the IEEE 1394 serial bus standard.

7. The method of claim 4, wherein the talker bus bridge portal provides the bandwidth change request for the talker.

8. The method of claim 7, further comprising providing the bandwidth change request from the talker portal to one or more intermediary portals.

9. The method of claim 8, further comprising informing one or more intermediary controllers associated with the one or more intermediary portals of the bandwidth change request.

10. The method of claim 9, wherein one of the one or more intermediary portals is a listener portal that informs a listener controller of the bandwidth change request.

11. The method of claim 10, wherein the listener controller returns a confirmation message to the talker.

12. A bus bridge interconnect, comprising:

an isochronous resource manager (IRM) associated with a talker, wherein the IRM signals a bandwidth change request to one or more bus bridge portals;

a bus bridge portal to accept bandwidth change requests from the IRM; a plurality of listeners; and a plurality of controllers, each controller associated with a corresponding listener, each controller to inform each listener of the bandwidth change request.

13. The system of claim 12, wherein the bus is compatible with the EEE 1394 serial bus standard.

14. The system of claim 12, wherein the talker provides the IRM with a bandwidth change request.

15. The system of claim 12, wherein the bus bridge portal is a talker portal that provides the bandwidth change request for a talker.

16. The system of claim 15, further comprising one or more intermediary portals connected with the talker portal.

17. The system of claim 16, further comprising one or more intermediary controllers connected with the one or more intermediary portals.

18. The system of claim 17, further comprising a listener portal connected with one of the one or more intermediary portals.

19. The system of claim 12, further comprising a listener controller connected with a listener portal, wherein the listener controller returns a confirmation message to the talker.

20. The system of claim 12, wherein one or more controllers modify bandwidth allocations associated with the bandwidth change request.

21. A bus bridge interconnect, comprising:

means for providing a bandwidth change request via a talker bus bridge portal from a talker to an isochronous resource manager (IRM);

means for providing the bandwidth change request from the IRM to one or more bus bridge portals, wherein one or more bus bridge portals are listener portals and one or more bus bridge portals are intermediary portals; and means for informing a plurality of listeners of the bandwidth adjustment.

22. The system of claim 21, further comprising means for providing the bandwidth change request to the isochronous resource manager from a talker.

23. The system of claim 21, wherein the talker bus bridge portal provides the bandwidth change request for a talker.

24. The system of claim 23, further comprising means for providing the bandwidth change request from the talker bus bridge portal to one or more intermediary portals.

25. The system of claim 24, further comprising means for informing one or more intermediary controllers associated with the one or more intermediary portals of the bandwidth change request.

26. The system of claim 25, wherein one of the one or more intermediary portals is a listener portal that informs a listener controller of the bandwidth change request.

27. The system of claim 26, wherein the listener controller includes means for returning a confirmation message to the talker.

28. A bus bridge interconnect, comprising:

means for sensing a bandwidth change request from a talker by an isochronous resource manager (IRM);

means for instigating a bandwidth adjustment associated with the bandwidth change request from the IRM to one or more bus bridge portals; and means for informing a plurality of listeners of the bandwidth adjustment.

29. The system of claim 28, further comprising:

means for modifying bandwidth change requests in bus bridge portals, wherein channel assignments and connections are maintained.

* * * * *